(12) United States Patent
Tao et al.

(10) Patent No.: US 11,522,962 B2
(45) Date of Patent: Dec. 6, 2022

(54) METHODS AND APPARATUSES FOR IP AND NON-IP DATA COMMUNICATION USING A UNIFIED INTERFACE

(71) Applicant: Telefonaktiebolaget LM Ericsson (publ), Stockholm (SE)

(72) Inventors: Jingrui Tao, Guangzhou (CN); Yun Zhang, Beijing (CN); Deyang Chen, Guangzhou (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/299,842

(22) PCT Filed: Dec. 12, 2018

(86) PCT No.: PCT/CN2018/120615
§ 371 (c)(1),
(2) Date: Jun. 4, 2021

(87) PCT Pub. No.: WO2020/118562
PCT Pub. Date: Jun. 18, 2020

(65) Prior Publication Data
US 2022/0038540 A1    Feb. 3, 2022

(51) Int. Cl.
*G06F 15/173* (2006.01)
*H04L 67/147* (2022.01)
(Continued)

(52) U.S. Cl.
CPC .......... *H04L 67/147* (2013.01); *H04L 67/141* (2013.01); *H04L 69/18* (2013.01); *H04W 76/16* (2018.02)

(58) Field of Classification Search
CPC .......................... H04L 67/147; H04L 67/141
(Continued)

(56) References Cited

U.S. PATENT DOCUMENTS

2016/0286385 A1\* 9/2016 Ryu ..................... H04W 68/00
2018/0192461 A1    7/2018 Naik et al.
(Continued)

FOREIGN PATENT DOCUMENTS

CN    107438290 A    12/2017
CN    107438291 A    12/2017
(Continued)

OTHER PUBLICATIONS

3GPP, "3GPP TS 23.682 V15.4.0", 3rd Generation Partnership Project; Technical Specification Group Services and System Aspects; Architecture enhancements to facilitate communications with packet data networks and applications (Release 15), Mar. 2018, 1-124.
(Continued)

*Primary Examiner* — Hee Soo Kim
(74) *Attorney, Agent, or Firm* — Murphy, Bilak, Homiller, PLLC

(57) ABSTRACT

Methods and apparatuses are disclosed for internet protocol (IP) and non-IP data communication. According to an embodiment, a network exposure node performs a configuration procedure such that both IP data delivery (IPDD) and non-IP data delivery (NIDD) can be supported through a unified interface between the network exposure node and a server. The network exposure node performs IPDD or NIDD through the unified interface.

16 Claims, 17 Drawing Sheets

(51) Int. Cl.
*H04L 69/18* (2022.01)
*H04L 67/141* (2022.01)
*H04W 76/16* (2018.01)

(58) Field of Classification Search
USPC ......................................................... 709/224
See application file for complete search history.

(56) References Cited

U.S. PATENT DOCUMENTS

| | | | |
|---|---|---|---|
| 2018/0219981 A1* | 8/2018 | Backman | H04L 65/102 |
| 2018/0343601 A1 | 11/2018 | Livanos | |
| 2019/0028337 A1* | 1/2019 | Ryu | H04W 8/02 |
| 2020/0068047 A1* | 2/2020 | Huang | H04L 67/141 |
| 2021/0144624 A1* | 5/2021 | Jain | H04W 48/02 |

FOREIGN PATENT DOCUMENTS

| | | | | |
|---|---|---|---|---|
| CN | 108632812 A | 10/2018 | | |
| WO | WO-2017202194 A1 * | 11/2017 | ............ | H04W 76/10 |

OTHER PUBLICATIONS

3GPP, "3GPP TS 29.061 V15.4.0", 3rd Generation Partnership Project; Technical Specification Group Core Network and Terminals; Interworking between the Public Land Mobile Network (PLMN) supporting packet based services and Packet Data Networks (PDN) (Release 15), Sep. 2018, 1-175.

3GPP, "3GPP TS 29.122 V2.0.0", 3rd Generation Partnership Project; Technical Specification Group Core Network and Terminals; T8 reference point for Northbound APIs (Release 15), Jun. 2018, 1-255.

Intel, et al., "Architecture Assumption for External Exposure", SA WG2 Meeting #127-Bis, S2-185202, Newport Beach, CA, USA, May 28-Jun. 1, 2018, 1-4.

"3rd Generation Partnership Project; Technical Specification Group Core Network and Terminals; Home Subscriber Server (HSS) diameter interfaces for interworking with packet data networks and applications (Release 15)", 3GPP TS 29.336 V15.4.0, Sep. 2018, 73 pages.

"3rd Generation Partnership Project; Technical Specification Group Core Network and Terminals; T8 reference point for Northbound APIs; (Release 15)", 3GPP TS 29.122 V15.1.0, Sep. 2018, 273 pages.

"3rd Generation Partnership Project; Technical Specification Group Services and System Aspects; Architecture enhancements to facilitate communications with packet data networks and applications (Release 16)", 3GPP TS 23.682 V16.0.0, Sep. 2018, 126 pages.

3GPP , "3GPP TS 29.522 V15.1.0", 3rd Generation Partnership Project; Technical Specification Group Core Network and Terminals; 5G System; Network Exposure Function Northbound APIs; Stage 3 (Release 15), Sep. 2018, 1-29.

* cited by examiner

METHODS AND APPARATUSES FOR IP AND NON-IP DATA COMMUNICATION USING A UNIFIED INTERFACE

TECHNICAL FIELD

Embodiments of the disclosure generally relate to wireless communication, and, more particularly, to methods and apparatuses for internet protocol (IP) and non-IP data communication.

BACKGROUND

This section introduces aspects that may facilitate better understanding of the present disclosure. Accordingly, the statements of this section are to be read in this light and are not to be understood as admissions about what is in the prior art or what is not in the prior art.

Many cellular Internet of things (CIoT) applications need to run for years over batteries and reduce overall energy consumption. To improve their power consumption efficiency, 3rd generation partnership project (3GPP) provides two ways for small data communication between CIoT user equipment (UE) and service capability server (SCS)/application server (AS): IP data delivery (IPDD) and non-IP data delivery (NIDD).

FIG. 1 is a diagram illustrating IPDD and NIDD in CIoT. As shown, between a UE and an SCS/AS, there are an evolved node B (eNB), a serving general packet radio service (GPRS) support node (SGSN)/mobility management entity (MME), a serving gateway (SGW), a packet data network (PDN) gateway (PGW) and a service capability exposure function (SCEF). As used in FIG. 1, the term "CP" refers to control plane, the term "DoNAS" refers to data over non-access stratum (NAS), the term "UP" refers to user plane, and the term "RRC" refers to radio resource control. The IP data to the SCS/AS is accomplished by the delivery using the PGW. The non-IP data delivery to the SCS/AS is accomplished by one of two mechanisms. In case of NIDD, the UE is unaware that a particular non-IP PDN connection is provided via the SCEF or via the PGW.

For one of the two mechanisms, a point-to-point (PtP) SGi tunnel based on user datagram protocol (UDP)/IP may be used to deliver non-IP data to the SCS/AS via the PGW. The PGW acts as a transparent forwarding node for the payload between the UE and the SCS/AS. For uplink non-IP data, the PGW forwards the received data to the SCS/AS over the SGi PtP tunnel using UDP/IP encapsulation. For downlink non-IP data, the SCS/AS sends the data using UDP/IP encapsulation with the IP address of the UE and the 3GPP defined UDP port for "non-IP" data. The PGW decapsulates the received data (i.e. removes the UDP/IP headers) and forwards the data to the SGW on the GPRS tunnelling protocol (GTP)-U tunnel identified by the IP address of the UE (i.e. PDN connection) for delivery to the UE.

For the other of the two mechanisms, the SCEF is used via T8 interface. For example, T8 representational state transfer (Restful) application programming interface (API) is defined by 3GPP for the SCS/AS to use NIDD capability from the operator network. NIDD via the SCEF is handled using a PDN connection to the SCEF. The UE may obtain a non-IP PDN connection to the SCEF either during Attach procedure or via UE requested PDN connectivity or via packet data protocol (PDP) Context Activation procedure. There are three major T8 interfaces defined in 3GPP for the SCS/AS to support NIDD via the SCEF. The first interface is NIDD Configuration, which is used by the SCS/AS to configure necessary information at the SCEF and a home subscriber server (HSS). The second interface is Mobile Originated (MO) NIDD, which is used by the SCS/AS to receive non-IP data from the UE. The third interface is Mobile Terminated (MT) NIDD, which is used by the SCS/AS to send non-IP data to UE(s).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for IP and non-IP data communication.

According to one aspect of the disclosure, there is provided a method implemented at a network exposure node. The method comprises performing a configuration procedure such that both IPDD and NIDD can be supported through a unified interface between the network exposure node and a server. The method further comprises performing IPDD or NIDD through the unified interface.

In an embodiment of the disclosure, the performing the configuration procedure comprises receiving, from the server, a first request for configuring data delivery for a terminal device. The performing the configuration procedure further comprises generating a second request for authorizing IPDD/NIDD between the terminal device and the server, based on the first request. The performing the configuration procedure further comprises sending the second request to a subscriber management node. The performing the configuration procedure further comprises receiving, from the subscriber management node, a reply in response to the second request.

In an embodiment of the disclosure, the first request includes an identifier (ID) of the terminal device and an ID of the server. The generating the second request comprises determining an access point name (APN) for IPDD/NIDD between the terminal device and the server, based on the ID of the terminal device and the ID of the server. The second request includes the determined APN for IPDD/NIDD and the ID of the terminal device.

In an embodiment of the disclosure, the first request indicates a port of the server. Alternatively, the port of the server is pre-configured in the network exposure node.

In an embodiment of the disclosure, the server is an SCS or an AS, and the port of the server is an SCS/AS port. The second request is an IPDD/NIDD Information Request message, and the reply in response to the second request is an IPDD/NIDD Information Answer message.

In an embodiment of the disclosure, the performing IPDD through the unified interface comprises obtaining, from a packet gateway node, connection information about a connection between a terminal device and the packet gateway node. The performing IPDD through the unified interface further comprises, in response to receiving a data packet from the terminal device via the packet gateway node, determining an IP address of the server based on the data packet, the obtained connection information and a result of the configuration procedure. The performing IPDD through the unified interface further comprises sending data from the data packet to the server through the unified interface based on the determined IP address of the server.

In an embodiment of the disclosure, the connection information includes an IP address of the terminal device, an international mobile subscriber identity (IMSI) of the terminal device, and an APN for IPDD. The result of the configuration procedure includes the IMSI of the terminal device, the APN for IPDD, and an IP address of the server. The determining the IP address of the server comprises determining a combination of the IMSI of the terminal device and the APN for IPDD from the connection information, based on an IP address of the terminal device included in the data packet. The determining the IP address of the server further comprises determining the IP address of the server from the result of the configuration procedure, based on the determined combination.

In an embodiment of the disclosure, the connection information is received via Radius or Diameter protocol. The data from the data packet is sent in an Uplink Data Notification Request message.

In an embodiment of the disclosure, the performing IPDD or NIDD through the unified interface comprises receiving, from the server through the unified interface, a first request for data delivery to a terminal device. The first request includes data to be delivered to the terminal device. The performing IPDD or NIDD through the unified interface further comprises sending, to a subscriber management node, a second request for monitoring reachability status of the terminal device. The performing IPDD or NIDD through the unified interface further comprises receiving, from the subscriber management node, at least one monitoring report about reachability status of the terminal device. The performing IPDD or NIDD through the unified interface further comprises sending the data to the terminal device based on the received at least one monitoring report.

In an embodiment of the disclosure, the first request indicates an IP protocol of the terminal device. Alternatively, the IP protocol the terminal device is pre-configured in the network exposure node.

In an embodiment of the disclosure, the first request further indicates an application port of the terminal device. Alternatively, the application port of the terminal device is pre-configured in the network exposure node.

In an embodiment of the disclosure, the receiving the at least one monitoring report comprises receiving a monitoring report indicating that the terminal device is reachable via an APN for NIDD. The sending the data to the terminal device comprises: in response to the monitoring report, sending the data to the terminal device through NIDD.

In an embodiment of the disclosure, the receiving the at least one monitoring report comprises receiving a monitoring report indicating that the terminal device is not reachable. The receiving the at least one monitoring report further comprises receiving a subsequent monitoring report indicating that the terminal device is reachable via an APN for NIDD. The sending the data to the terminal device comprises, in response to the subsequent monitoring report, sending the data to the terminal device through NIDD.

In an embodiment of the disclosure, the receiving the at least one monitoring report comprises: receiving a monitoring report indicating that the terminal device is reachable via an APN for IPDD and has an IP address. The sending the data to the terminal device comprises, in response to the monitoring report, generating a data packet including the data from the first request, based on the IP address and the IP protocol of the terminal device. The sending the data to the terminal device further comprises sending the data packet to a packet gateway node based on the APN for IPDD.

In an embodiment of the disclosure, the receiving the at least one monitoring report comprises receiving a monitoring report indicating that the terminal device is not reachable. The receiving the at least one monitoring report further comprises receiving a subsequent monitoring report indicating that the terminal device is reachable via an APN for IPDD and has an IP address. The sending the data to the terminal device comprises, in response to the subsequent monitoring report, generating a data packet including the data from the first request, based on the IP address and the IP protocol of the terminal device. The sending the data to the terminal device further comprises sending the data packet to a packet gateway node based on the APN for IPDD.

In an embodiment of the disclosure, the first request is a Downlink Data Delivery Request message, the second request is a Configuration Information Request message, and the at least one monitoring report is received in a Configuration Information Response message or a Reporting Information Request message.

According to another aspect of the disclosure, there is provided a method implemented at a server. The method comprises initiating a configuration procedure towards a network exposure node such that both IPDD and NIDD can be supported through a unified interface between the network exposure node and the server. The method further comprises performing IPDD or NIDD through the unified interface.

In an embodiment of the disclosure, the initiating the configuration procedure comprises sending, to the network exposure node, a first request for configuring data delivery for a terminal device. The first request indicates a port of the server.

In an embodiment of the disclosure, the performing IPDD or NIDD through the unified interface comprises sending, to the network exposure node through the unified interface, a second request for data delivery to a terminal device. The second request includes data to be delivered to the terminal device and indicates an IP protocol of the terminal device.

In an embodiment of the disclosure, the second request further indicates an application port of the terminal device.

According to another aspect of the disclosure, there is provided a method implemented at a subscriber management node. The method comprises receiving, from a network exposure node, a request for authorizing IPDD between a terminal device and a server. The method further comprises sending, to the network exposure node, a reply in response to the request.

In an embodiment of the disclosure, the request includes an APN for IPDD between the terminal device and the server and an ID of the terminal device. The reply in response to the request includes an IMSI of the terminal device.

According to another aspect of the disclosure, there is provided a method implemented at a packet gateway node. The method comprises performing a connection establishment procedure such that a connection is established between a terminal device and the packet gateway node. The method further comprises sending connection information about the connection to a network exposure node. The method further comprises receiving, from the terminal device, a first data packet including data to be delivered to a server. The first data packet indicates an IP address of the network exposure node. The method further comprises sending, to the network exposure node, a second data packet including the data, based on the IP address of the network exposure node.

In an embodiment of the disclosure, each of the first and second data packets further indicates a port of the server.

In an embodiment of the disclosure, the connection information includes an IP address of the terminal device, an IMSI of the terminal device, and an APN for IPDD.

According to another aspect of the disclosure, there is provided a method implemented at a terminal device. The method comprises initiating a connection establishment procedure such that a connection is established between the terminal device and a packet gateway node. The method further comprises sending, to the packet gateway node, a data packet including data to be delivered to a server. The data packet indicates an IP address of the network exposure node.

In an embodiment of the disclosure, the data packet further indicates a port of the server.

According to another aspect of the disclosure, there is provided a network exposure node. The network exposure node comprises at least one processor and at least one memory. The at least one memory contains instructions executable by the at least one processor, whereby the network exposure node is operative to perform a configuration procedure such that both IPDD and NIDD can be supported through a unified interface between the network exposure node and a server. The network exposure node is further operative to perform IPDD or NIDD through the unified interface.

In an embodiment of the disclosure, the network exposure node is operative to perform the method according to the above aspect.

According to another aspect of the disclosure, there is provided a server. The server comprises at least one processor and at least one memory. The at least one memory contains instructions executable by the at least one processor, whereby the server is operative to initiate a configuration procedure towards a network exposure node such that both IPDD and NIDD can be supported through a unified interface between the network exposure node and the server. The server is further operative to perform IPDD or NIDD through the unified interface.

In an embodiment of the disclosure, the subscriber management node is operative to perform the method according to the above aspect.

According to another aspect of the disclosure, there is provided a subscriber management node. The subscriber management node comprises at least one processor and at least one memory. The at least one memory contains instructions executable by the at least one processor, whereby the subscriber management node is operative to receive, from a network exposure node, a request for authorizing IPDD between a terminal device and a server. The subscriber management node is further operative to send, to the network exposure node, a reply in response to the request.

In an embodiment of the disclosure, the subscriber management node is operative to perform the method according to the above aspect.

According to another aspect of the disclosure, there is provided a packet gateway node. The packet gateway node comprises at least one processor and at least one memory. The at least one memory contains instructions executable by the at least one processor, whereby the packet gateway node is operative to perform a connection establishment procedure such that a connection is established between a terminal device and the packet gateway node. The packet gateway node is further operative to send connection information about the connection to a network exposure node. The packet gateway node is further operative to receive, from the terminal device, a first data packet including data to be delivered to a server. The first data packet indicates an IP address of the network exposure node. The packet gateway node is further operative to send, to the network exposure node, a second data packet including the data, based on the IP address of the network exposure node.

In an embodiment of the disclosure, the packet gateway node is operative to perform the method according to the above aspect.

According to another aspect of the disclosure, there is provided a terminal device. The terminal device comprises at least one processor and at least one memory. The at least one memory contains instructions executable by the at least one processor, whereby the terminal device is operative to initiate a connection establishment procedure such that a connection is established between the terminal device and a packet gateway node. The terminal device is further operative to send, to the packet gateway node, a data packet including data to be delivered to a server. The data packet indicates an IP address of the network exposure node.

In an embodiment of the disclosure, the terminal device is operative to perform the method according to the above aspect.

According to another aspect of the disclosure, there is provided a computer program product. The computer program product comprises instructions which when executed by at least one processor, cause the at least one processor to perform the method according to the above aspect.

According to another aspect of the disclosure, there is provided a computer readable storage medium. The computer readable storage medium comprises instructions which when executed by at least one processor, cause the at least one processor to perform the method according to the above aspect.

According to another aspect of the disclosure, there is provided a network exposure node. The network exposure node comprises a configuration module for performing a configuration procedure such that both IPDD and NIDD can be supported through a unified interface between the network exposure node and a server. The network exposure node further comprises a data delivery module for performing IPDD or NIDD through the unified interface.

According to another aspect of the disclosure, there is provided a server. The server comprises an initiation module for initiating a configuration procedure towards a network exposure node such that both IPDD and NIDD can be supported through a unified interface between the network exposure node and the server. The server further comprises a data delivery module for performing IPDD or NIDD through the unified interface.

According to another aspect of the disclosure, there is provided a subscriber management node. The subscriber management node comprises a reception module for receiving, from a network exposure node, a request for authorizing IPDD between a terminal device and a server. The subscriber management node further comprises a sending module for sending, to the network exposure node, a reply in response to the request.

According to another aspect of the disclosure, there is provided a packet gateway node. The packet gateway node comprises a connection module for performing a connection establishment procedure such that a connection is established between a terminal device and the packet gateway node. The packet gateway node further comprises a sending module for sending connection information about the connection to a network exposure node. The packet gateway node further comprises a reception module for receiving, from the terminal device, a first data packet including data to be delivered to a server. The first data packet indicates an IP address of the network exposure node. The sending module further sends, to the network exposure node, a second data packet including the data, based on the IP address of the network exposure node.

According to another aspect of the disclosure, there is provided a terminal device. The terminal device comprises an initiation module for initiating a connection establishment procedure such that a connection is established between the terminal device and a packet gateway node. The terminal device further comprises a sending module for sending, to the packet gateway node, a data packet including data to be delivered to a server. The data packet indicates an IP address of the network exposure node.

According to some embodiment(s) of the disclosure, the data delivery procedure for the server can be simplified.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

Figure 1:
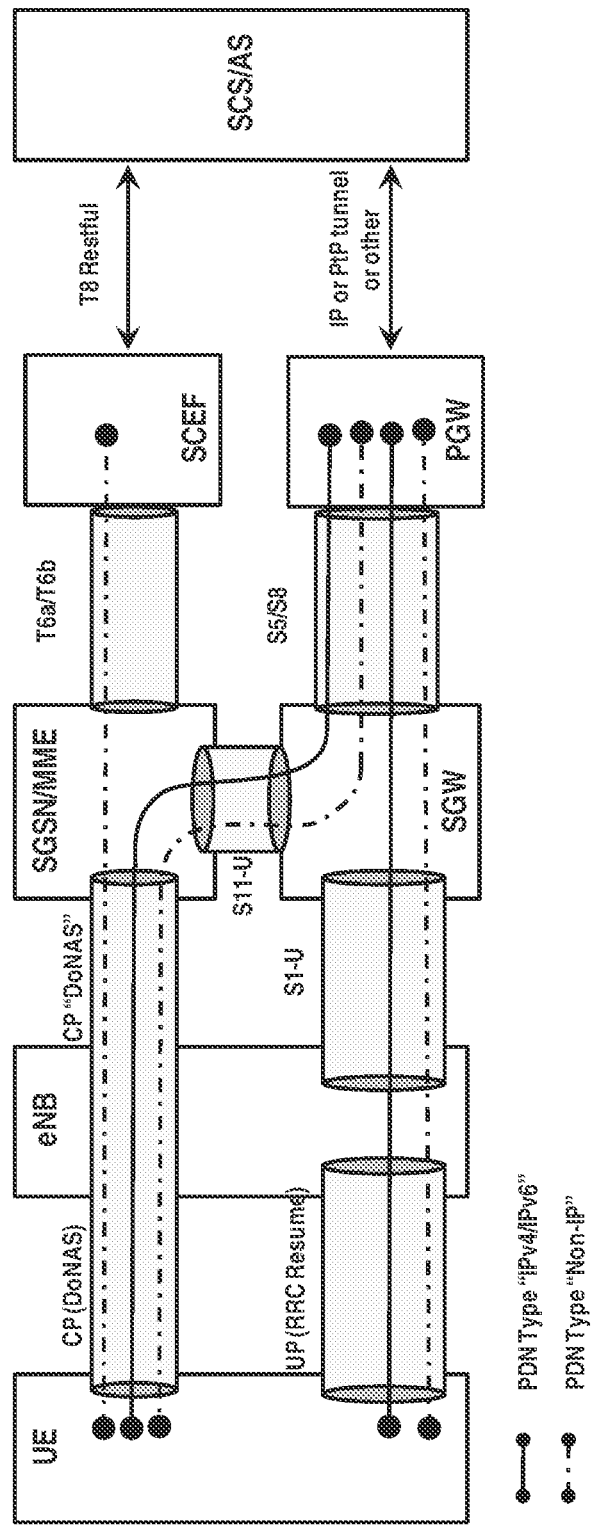
FIG. 1 is a diagram illustrating IPDD and NIDD in CIoT.

For the purpose of explanation, details are set forth in the following description in order to provide a thorough understanding of the embodiments disclosed. It is apparent, however, to those skilled in the art that the embodiments may be implemented without these specific details or with an equivalent arrangement.

In CIoT domain, an enterprise may need to manage millions of UEs. Some UEs may use narrow band (NB) IoT network and other UEs may use category (Cat)-M1 network. In addition, some UEs may use IPDD only, some UEs may use NIDD only, and other UEs use both. It is difficult for the enterprise to manage UEs using different network and different data delivery channels (IP, non-IP, or both).

When the operator selects to use PGW to support IPDD and use SCEF to support NIDD for small data delivery, SCS/AS needs different ways to handle IPDD and NIDD. However, it would be desirable to expose a unified way for SCS/AS to handle both IPDD and NIDD. For example, SCS/AS can get below benefits for combined IP and non-IP data delivery.

Firstly, SCS/AS does not need to take care that a UE is a Cat-M1 device or an NB IoT device, since SCEF can detect this information from the operator network and use this information to enhance the data delivery efficiency. For example, when a UE is attached without a PDN connection and downlink data delivery is required, SCEF can based on the device type (Cat-M1 or NB IoT) to decide if IP PDN or non-IP PDN is preferred. Then SCEF can use device triggering to trigger the preferred PDN connection setup.

Secondly, SCS/AS does not need to take care that a UE can support IPDD only, NIDD only, or both. SCEF can detect the UE is attached to the operator network via IP PDN or non-IP PDN. Then SCEF can smartly select the proper PDN to deliver downlink data to customer.

Thirdly, in case a UE can support both IPDD and NIDD, when the UE is attached to the operator network with either non-IP APN or IP APN, SCS/AS does not need to take care what APN the UE is attached to. SCEF will smartly detect the attached PDN for the UE and use the proper PDN to deliver a downlink message for SCS/AS.

Fourthly, Cat-M1 and NB IoT UEs' mobile originated (MO) IP data and non-IP data can be sent to SCEF first. SCEF will always forward the data to SCS/AS via T8 interface. So SCS/AS does not care the MO data is from IP PDN or non-IP PDN. Nor does it care the data is from a Cat-M1 device or an NB IoT device.

In addition, from the operator's view, it would be desirable that the additional benefits and features on NIDD provided by SCEF can also be applied on IPDD. For example, the operator can be allowed to have unified security control such that a CIoT UE can only communicate with allowed SCS/AS. Without permission, SCS/AS cannot send a mobile terminated (MT) message to a particular CIoT UE via either IPDD or NIDD or both. The operator can also be allowed to provide unified buffering strategy for MT IP and non-IP data until a UE wakes up from power saving state. It can also be allowed to protect the radio and core network from message flooding and bandwidth over-usage from SCS/AS, since SCEF can apply SCS/AS level throttling. For example, SCEF may throttle the IP traffic of an SCS/AS dynamically when SCEF detects the SCS/AS violates the throttling rule. Group-based message delivery can also be supported even if some UEs use IPDD and some UEs use NIDD. In particular, it can be allowed that SCS/AS sends one message to SCEF and SCEF forwards the message to multiple UEs, no matter the UE can support NIDD only, IPDD only or both. In addition, unified SCS/AS level dynamic service level agreement (SLA) can be enforced on both IPDD and NIDD, such as throttling and quota control. For example, SCEF can limit a UE to send and receive 10 messages per hour no matter the UE use IPDD, NIDD or both.

The present disclosure proposes improved solutions for IP and non-IP data communication. The basic idea is to expose a unified interface (e.g. T8) to a server (e.g. SCS/AS) for handling both IPDD and NIDD. Hereinafter, the solutions will be described in detail with reference to FIGS. 2-27.

Figure 2:
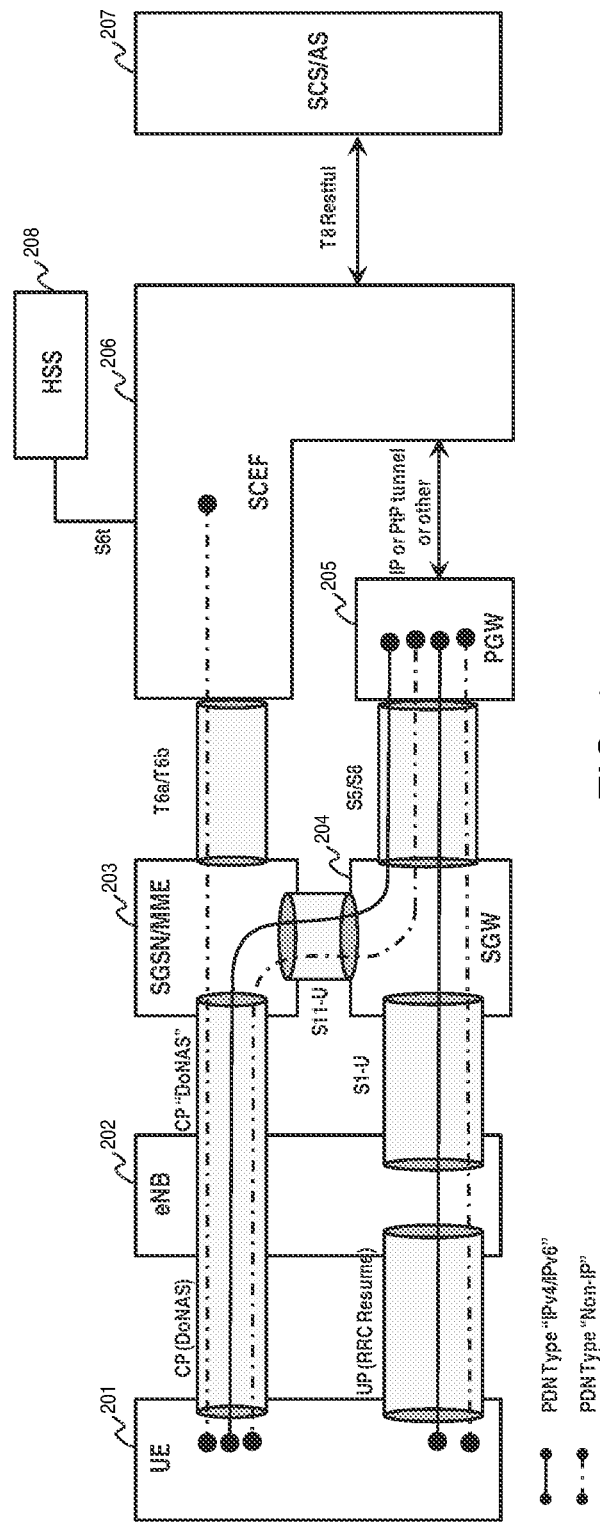
FIG. 2 is a diagram showing an exemplary wireless communication system according to an embodiment of the disclosure.

FIG. 2 is a diagram showing an exemplary wireless communication system according to an embodiment of the disclosure. As shown, the wireless communication system comprises a user equipment (UE) 201, an evolved node B (eNB) 202, a serving general packet radio service (GPRS) support node (SGSN)/mobility management entity (MME) 203, a serving gateway (SGW) 204, a packet data network (PDN) gateway (PGW) 205, a service capability exposure function (SCEF) 206, a service capability server (SCS)/application server (AS) 207, and a home subscriber server (HSS) 208. Note that the number of each entity mentioned above may be more than one.

The UE 201 can communicate through a radio access communication link with the eNB 202. The UE may also be referred to as, for example, terminal device, access terminal, mobile station, mobile unit, subscriber station, or the like. It may refer to any end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

The eNB 202 is an element in an evolved universal terrestrial radio access network (E-UTRAN). The eNB 202 can provide radio access communication links to UEs that are within its communication service cell and control communications therebetween. It is also possible that the eNB 202 may be replaced by a radio network controller (RNC) node and a base station in an universal mobile telecommunications system (UMTS) terrestrial RAN (UTRAN) or a global system for mobile communication (GSM) enhanced data rate for GSM evolution (EDGE) RAN (GERAN).

The SGSN/MME 203 means either the SGSN or the MME or both. The SGSN is a core network node in UMTS and has a user-plane function and a control-plane function. The user-plane function of the SGSN can transfer user data packets of the UE 201 between the eNB 202 and the PGW 205. The control-plane function of the SGSN can carry out mobility management of the UE 201, bearer management and the like. The MME is a core network node in evolved packet system (EPS) and can carry out the mobility management of the UE 201, the bearer management, and the like. The SGW 204 is a packet transfer node in the core network of the EPS. The SGW 204 can transfer user data packets of the UE 201 between the eNB 201 and the PGW 205. The PGW 205 is a core network node in the EPS. The PGW 205 is a user-plane packet transfer node in the core network and can transfer user data packets of the UE 201. The PGW 205 can serve as a gateway to an external PDN and provide the UE 201 with the connectivity to the external PDN.

The SCEF 206 can securely expose the services and capabilities provided by 3GPP networks by providing access to the services and capabilities through homogenous network application programming interfaces (APIs) defined by open mobile alliance (OMA), GSM alliance (GSMA) and possibly other standardization bodies. The SCEF 206 may communicate with the SGSN/MME 203 via T6a/T6b interface, and with the PGW 205 via IP tunnel, PtP tunnel, or the like.

The SCS/AS 207 means either the SCS or the AS or both. The SCS can make open service access (OSA) standard interfaces accessible by application and provide an abstraction of network protocol for application developers. As a gateway between applications and the network, the SCS can accomplish mapping of OSA interfaces onto network protocols and vice versa. The AS may be a type of server designed to install, operate and host applications and associated services for users. The SCS/AS 207 may communicate with the SCEF 206 via T8 interface (e.g. Restful interface). The HSS 208 is a control-plane node in the core network of 3GPP public land mobile network (PLMN) and can manage subscriber information of the UE 201. The HSS 208 may communicate with the SCEF 206 via S6t interface.

It should be noted that the SGSN/MME 203, the PGW 205, the SCEF 206, and the HSS 208 are merely exemplary examples of the components in the wireless communication system and may be replaced by components with similar functionalities. For example, in fifth generation (5G) core network (CN), the SGSN/MME may be replaced by an access and mobility management function (AMF), the PGW may be replaced by a user plane function (UPF), the SCEF may be replaced by a network exposure function (NEF), and the HSS may be replaced by a unified data management (UDM).

Figure 3:
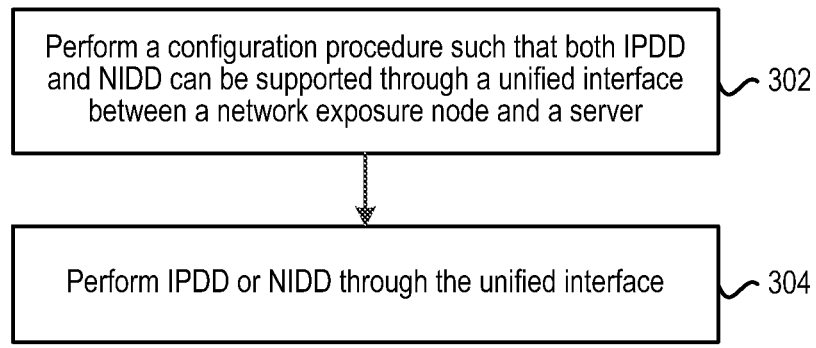
FIG. 3 is a flowchart illustrating a method implemented at a network exposure node according to an embodiment of the disclosure.

FIG. 3 is a flowchart illustrating a method implemented at a network exposure node according to an embodiment of the disclosure. For example, the network exposure node may take the form of an SCEF, an NEF, or any other entity having similar functionality. At block 302, the network exposure node performs a configuration procedure such that both IPDD and NIDD can be supported through a unified interface between the network exposure node and a server. For example, the server may be an SCS or an AS. The unified interface may be T8 interface. Block 302 may be implemented as blocks 406-412 of FIG. 4, which will be described later. At block 304, the network exposure node performs IPDD or NIDD through the unified interface. Block 304 may be implemented as blocks 614-618 of FIG. 6 or blocks 924-930 of FIG. 9, which will be described later.

Since a unified interface is exposed by the network exposure node for the server, the data delivery procedure for the server can be simplified. The operator can also have a unified way to manage the data delivery for both IPDD and NIDD. In addition, the additional features supported by the network exposure node for NIDD can be applied on IPDD as well.

Figure 4:
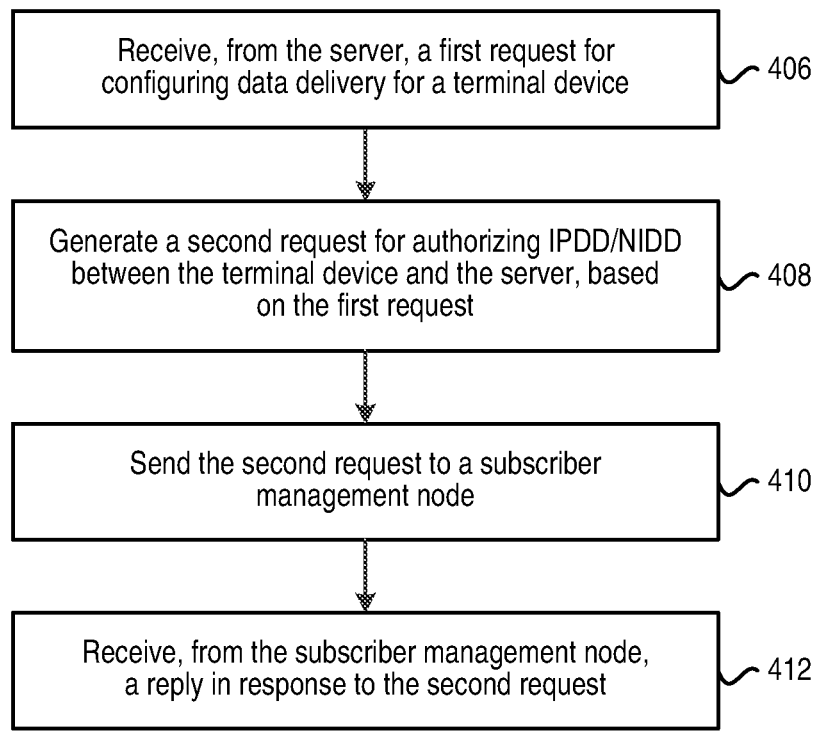
FIG. 4 is a flowchart for explaining the method of FIG. 3.

FIG. 4 is a flowchart for explaining the method of FIG. 3. At block 406, the network exposure node receives, from the server, a first request for configuring data delivery for a terminal device. The first request may include an identifier (ID) of the server, an IP address of the server and an ID of the terminal device. Optionally, the first request may further indicate a port of the server. It is also possible that the port of the server may be pre-configured in the network exposure node. For example, a default port may be configured for all terminal devices. In this case, the first request does not need to indicate the port of the server. The port may correspond to an application which needs to communicate with the terminal device. Different port may correspond to different application. As an exemplary example, the request may be a Data Delivery Configuration Request message, the ID of the server may be an SCS/AS ID, the ID of the terminal device may be an external ID, and the port of the server may be an number used to identify an SCS/AS.

At block 408, the network exposure node generates a second request for authorizing IPDD/NIDD between the terminal device and the server, based on the first request. For IPDD, the second request may include an APN for IPDD between the terminal device and the server, and the ID of the terminal device. For NIDD, the second request may include an APN for NIDD between the terminal device and the server, and the ID of the terminal device. The APN for IPDD/NIDD may be determined based on the IDs of the terminal device and the server which are included in the first request. As an example, there may be a predetermined correspondence between the APN for IPDD/NIDD and a combination of the IDs of the terminal device and the server. The APN for IPDD/NIDD may be derived by a lookup operation on a table reflecting the correspondence. Note that depending on the actual application scenario, various other ways may be used instead to derive the APN for IPDD/NIDD. As an exemplary example, for IPDD, the second request may be an IPDD Information Request message, which is a new message added into the current technical specifications. For NIDD, the second request may be an NIDD Information Request message.

At block 410, the network exposure node sends the second request to a subscriber management node. The subscriber management node may take the form of an HSS, a UDM, or any other entity having similar functionality. At block 412, the network exposure node receives, from the subscriber management node, a reply in response to the second request. Since the subscriber management node maintains the subscription information of the terminal device, the subscriber management node can verify whether the APN for IPDD/NIDD can be used by the terminal device for IPDD/NIDD. If the APN for IPDD/NIDD can be used by the terminal device for IPDD/NIDD, the reply may include an international mobile subscriber identity (IMSI) of the terminal device. As an exemplary example, for IPDD, the reply may be an IPDD Information Answer message, which is a new message added into the current technical specifications. For NIDD, the second request may be an NIDD Information Answer message.

Figure 5:
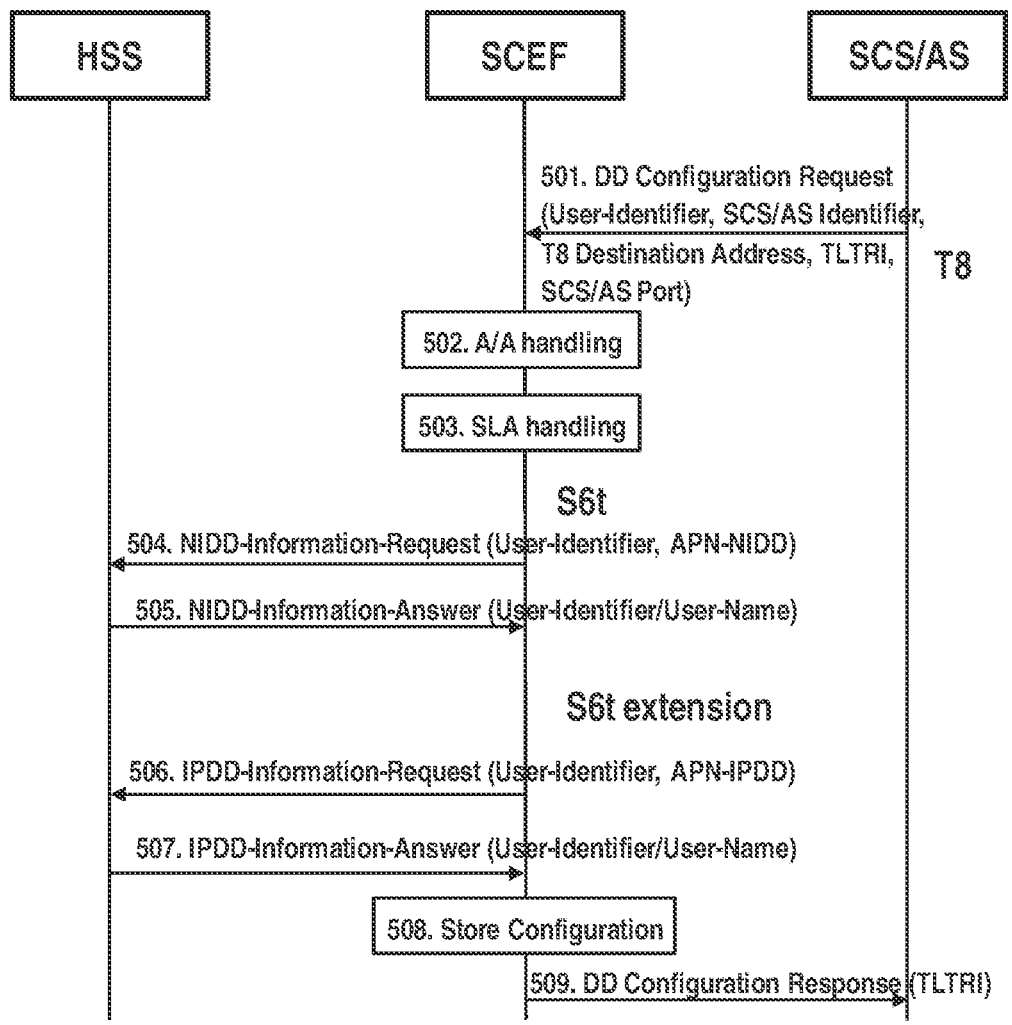
FIG. 5 is a flowchart illustrating an exemplary process according to an embodiment of the disclosure.

FIG. 5 is a flowchart illustrating an exemplary process according to an embodiment of the disclosure. In this process, the server is an SCS/AS, the network exposure node is an SCEF, and the subscriber management node is an HSS. This process may be used for combined data delivery configuration such that the SCS/AS can configure necessary information in the HSS and the SCEF for IPDD and NIDD. At block 501, the SCS/AS sends, to the SCEF, a Data Delivery Configuration Request message including a User-Identifier, an SCS/AS Identifier, a T8 Destination Address, a TLTRI, and an SCS/AS Port. The term "TLTRI" refers to T8 long term transaction reference ID. The User-Identifier may be an external identifier of a UE. The T8 Destination Address corresponds to the IP address of the server as mentioned above. Thus, current T8 interface can be enhanced to support both NIDD Configuration and IPDD Configuration. Compared with the existing NIDD Configuration, a new parameter, SCS/AS Port, is added to T8 interface for IPDD Configuration. Alternatively, a default SCS/AS port may be configured in the SCEF for all UEs. Then the SCS/AS does not need to provide the SCS/AS Port in the Data Delivery Configuration Request message.

At block 502, the SCEF performing authentication/authorization (A/A) handling by authenticating the SCS/AS and validating the Data Delivery Configuration Request parameters. At block 503, the SCEF performs service level agreement (SLA) handling by checking the SLA to verify whether the SCS/AS is allowed for this procedure. In this way, unified data communication management for both IP and non-IP between the SCS/AS and the UE can be introduced for the operator. At block 504, the SCEF generates and sends an NIDD Information Request message to the HSS to authorize the NIDD configuration procedure for the received User-Identifier. The NIDD Information Request message includes the User-Identifier (from the Data Delivery Configuration Request message) and an APN-NIDD. The SCEF may use the SCS/AS Identifier and the User-Identifier (which are obtained in block 501) to determine what APN-NIDD and APN-IPDD will be used to enable transfer of data between the UE and the SCS/AS. This determination may be based on local policies. The HSS may authorize the UE having the User-Identifier if the UE can use the APN-NIDD for NIDD. At block 505, the SCEF receives, from the HSS, necessary information for NIDD from an NIDD Information Answer message, if required. In the NIDD Information Answer message, the SCEF can get an IMSI of the User-Identifier. The IMSI may be used by the SCEF to communicate with an MME for NIDD MT and MO data delivery procedure.

At block 506, the SCEF sends an IPDD Information Request message to the HSS to authorize the IPDD configuration request for the received User-Identifier. The IPDD Information Request message includes the User-Identifier and the APN-IPDD. At block 507, the SCEF receives, from the HSS, necessary information for IPDD from an IPDD Information Answer message, if required. Thus, the current S6t interface is extended by adding two new commands (IPDD-Information-Request and IPDD-Information-Answer) to support IP data delivery management, which can improve the security control on IP data delivery. At block 508, the SCEF stores the Data Delivery Configuration data including the User Identifier, the APN-IPDD, the APN-NIDD, the SCS/AS Port, the T8 Destination Address, and the SCS/AS Identifier. These data may be used for later MO and MT data delivery procedure. At block 509, the SCEF sends a Data Delivery Configuration Response message to the SCS/AS to acknowledge acceptance of the Data Delivery Configuration. The Data Delivery Configuration Response message includes TLTRI and Cause.

Figure 6:
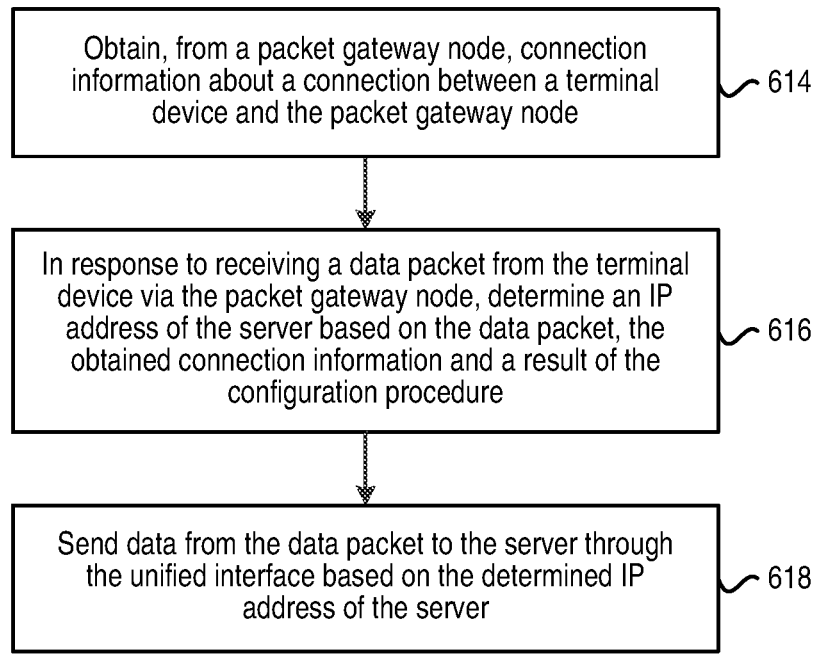
FIG. 6 is a flowchart for explaining the method of FIG. 3.
Figure 7:
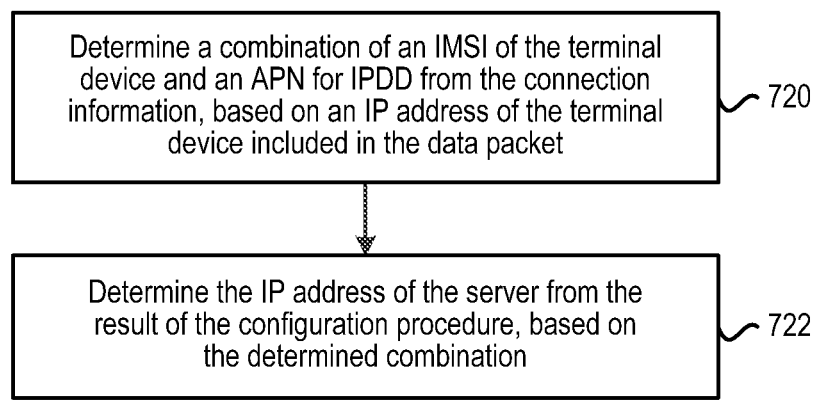
FIG. 7 is a flowchart for explaining the method of FIG. 6.

FIG. 6 is a flowchart for explaining the method of FIG. 3. The flowchart of FIG. 6 corresponds to MO IP data delivery. At block 614, the network exposure node obtains, from a packet gateway node, connection information about a connection between a terminal device and the packet gateway node. For example, the packet gateway node may take the form of a PGW, a UPF, or any other entity having similar functionality. The connection may be established between the terminal device and the packet gateway node during Attach procedure or via UE requested PDN connectivity or via PDP Context Activation procedure. The connection information may include an IP address of the terminal device, an IMSI of the terminal device, and an APN for IPDD. The connection information may be received (e.g. pushed) from the packet gateway node via Radius or Diameter protocol.

At block 616, in response to receiving a data packet from the terminal device via the packet gateway node, the network exposure node determines an IP address of the server based on the data packet, the obtained connection information and a result of the configuration procedure. As an example, block 616 may be implemented as blocks 720-722 of FIG. 7. As described above, the result of the configuration procedure may include the IMSI of the terminal device, the APN for IPDD, and an IP address of the server. At block 720, the network exposure node determines a combination of the IMSI of the terminal device and the APN for IPDD from the connection information, based on an IP address of the terminal device included in the data packet. At block 722, the network exposure node determines the IP address of the server from the result of the configuration procedure, based on the determined combination.

As another example of block 616, in case the first request indicates a port of the server, the result of the configuration procedure may include the IMSI of the terminal device, the APN for IPDD, the port of the server, and the IP address of the server. In this case, the network exposure node may determine the combination of the IMSI of the terminal device and the APN for IPDD as described with respect to block 720. Then, the network exposure node may determine the IP address of the server from the result of the configuration procedure, based on the determined combination and a port of the server indicated in the data packet. At block 618, the network exposure node sends data from the data packet to the server through the unified interface based on the determined IP address of the server.

Figure 8:
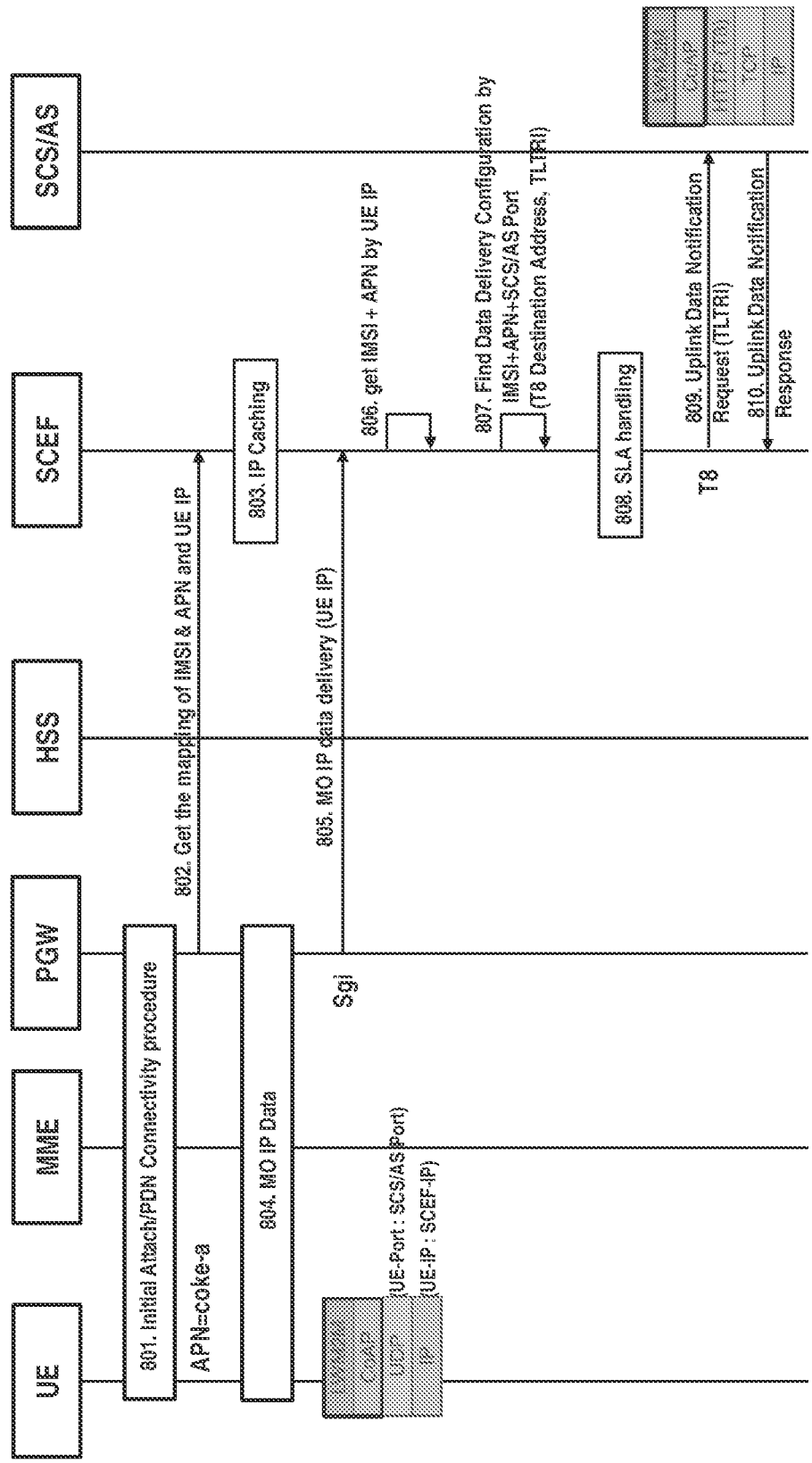
FIG. 8 is a flowchart illustrating an exemplary process according to another embodiment of the disclosure.

FIG. 8 is a flowchart illustrating an exemplary process according to another embodiment of the disclosure. In this process, the server is an SCS/AS, the network exposure node is an SCEF, the subscriber management node is an HSS, and the packet gateway node is a PGW. This process may be used for MO IP data delivery such that the SCS/AS receives MO IP data from a UE via the SCEF. At block 801, the UE performs E-UTRAN Initial Attach procedure or UE requested PDN Connectivity procedure or PDP Context Activation Procedure such that the PGW assigns an IP address for the UE based on the value of an APN-IPDD. At block 802, the SCEF gets connection information for the UE from the PGW. The connection information includes the UE's IMSI, the APN-IPDD and the UE IP address. For example, the PGW may push the connection information via Radius or Diameter protocol. According to 3GPP technical specification (TS) 29.061, the SCEF may be a Radius server or Diameter application, which receives the connection information. Thus, the connection information may be sent to the SCEF without update on the PGW. At block 803, the SCEF caches the mapping between the UE IP address and a combination of the UE's IMSI and the APN-IPDD.

At block 804, the PGW receives MO IP data from the UE. The destination address in the MO IP data is the IP address of the SCEF, and the destination port in the MO IP data is the SCS/AS port, which is the value from the Data Delivery Configuration Request message shown in FIG. 5. In this way, the PGW can forward the data to the SCEF. Note that in the protocol stack, the term "LWM2M" refers to light weight machine-to-machine, the term "CoAP" refers to constrained application protocol, and the term "UDP" refers to user datagram protocol. At block 805, the SCEF receives the MO IP data from the UE via the PGW. At block 806, the SCEF decapsulates the received data (e.g. removes the UDP/IP headers) to get the UE IP address and the SCS/AS Port from the data. Based on the UE IP address, the SCEF finds the combination of the corresponding IMSI and APN-IPDD. At block 807, based on the IMSI, the APN-IPDD and the SCS/AS Port, the SCEF finds the Data Delivery Configuration. From the Data Delivery Configuration, the SCEF gets the T8 Destination Address of the SCS/AS and the SCS/AS Identifier.

At block 808, the SCEF validates the SLA if the UE's data can be delivered to the SCS/AS. At block 809, the SCEF sends an Uplink Data Notification Request message with the decapsulated data to the SCS/AS. Thus, T8 Uplink Data Notification interface (which is defined to deliver MO non-IP data to the SCS/AS) is reused to deliver IP data to the SCS/AS. In the protocol stack of the data, the term "HTTP" refers to hypertext transfer protocol and the term "TCP" refers to transmission control protocol. At block 810, the SCS/AS sends an Uplink Data Notification Response message to the SCEF. INote that for MO non-IP data delivery where SCS/AS receives MO non-IP data from UE via SCEF, the current MO NIDD procedure such as that defined in clause 5.13.4 of 3GPP TS23.682 may be reused.

Figure 9:
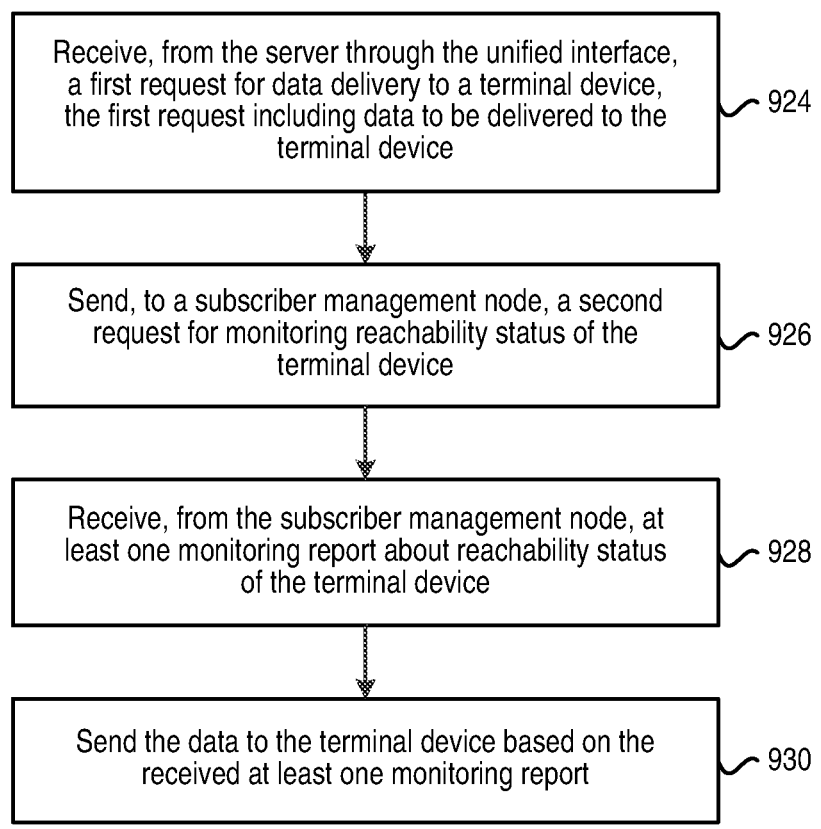
FIG. 9 is a flowchart for explaining the method of FIG. 3.

FIG. 9 is a flowchart for explaining the method of FIG. 3. The flowchart of FIG. 9 corresponds to MT non-IP and IP data delivery. At block 924, the network exposure node receives, from the server through the unified interface, a first request for data delivery to a terminal device that includes data to be delivered to the terminal device. For example, the first request may include an ID of the server and an ID of the terminal device, and may indicate an IP protocol of the terminal device. It is also possible that the IP protocol of the terminal device may be pre-configured in the network exposure node. Optionally, the first request may further indicate an application port of the terminal device. It is also possible that the application port of the terminal device may be pre-configured in the network exposure node. For example, if the server can only send an MT message to a single protocol (and optionally a single port) in the terminal device, a default IP protocol (and optionally a default application port) may be pre-configured in the network exposure node. In this case, the first request does not need to indicate the IP protocol (and optionally the application port). As an exemplary example, the first request may be a Downlink Data Delivery Request message.

At block 926, the network exposure node sends, to a subscriber management node, a second request for monitoring reachability status of the terminal device. As described above, the subscriber management node may take the form of an HSS, a UDM, or any other entity having similar functionality. The second request may include an ID of the terminal device (e.g. an external ID) and indicate the monitoring type is UE reachability. As an exemplary example, the second request may be a Configuration Information Request message. At block 928, the network exposure node receives, from the subscriber management node, at least one monitoring report about reachability status of the terminal device. At block 930, the network exposure node sends the data to the terminal device based on the received at least one monitoring report. Blocks 928-930 may be implemented as blocks 1032-1034 of FIG. 10, or blocks 1136-1140 of FIG. 11, or blocks 1442-1446 of FIG. 14, or blocks 1548-1554 of FIG. 15, which will be described later.

Figure 10:
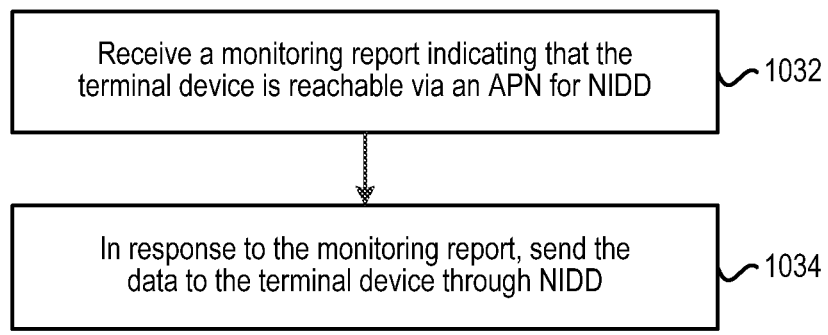
FIG. 10 is a flowchart for explaining the method of FIG. 9.

FIG. 10 is a flowchart for explaining the method of FIG. 9. The flowchart of FIG. 10 corresponds to MT non-IP data delivery. At block 1032, the network exposure node receives a monitoring report indicating that the terminal device is reachable via an APN for NIDD. As an exemplary example, the monitoring report may be received in a Configuration Information Response message. At block 1034, in response to the monitoring report, the network exposure node sends the data to the terminal device through NIDD. For example, steps 2, 3, 8 and 9 defined in clause 5.13.3 of 3GPP TS23.682 may be used to perform block 1034.

Figure 11:
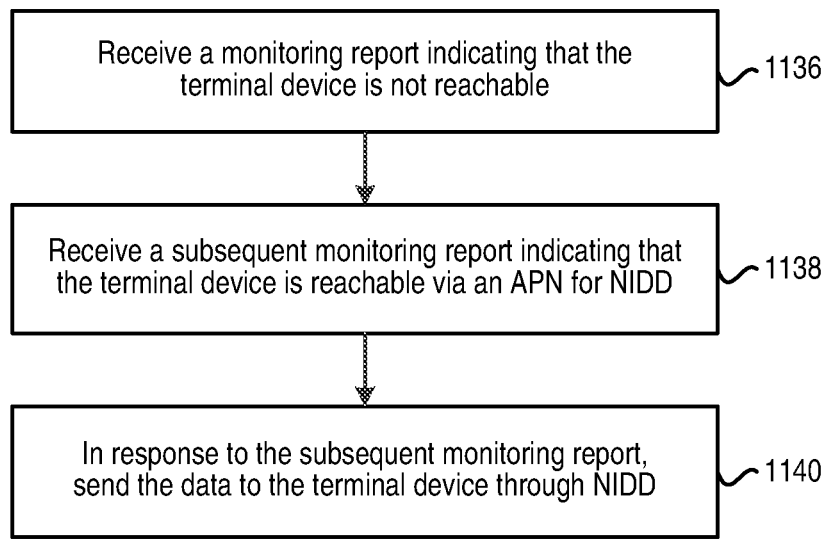
FIG. 11 is a flowchart for explaining the method of FIG. 9.

FIG. 11 is a flowchart for explaining the method of FIG. 9. The flowchart of FIG. 11 also corresponds to MT non-IP data delivery. At block 1136, the network exposure node receives a monitoring report indicating that the terminal device is not reachable. As an exemplary example, the monitoring report may be received in a Configuration Information Response message. At block 1138, the network exposure node receives a subsequent monitoring report indicating that the terminal device is reachable via an APN for NIDD. As an exemplary example, the monitoring report may be received in a Reporting Information Request message. At block 1140, in response to the subsequent monitoring report, the network exposure node sends the data to the terminal device through NIDD. For example, steps 2, 3, 8 and 9 defined in clause 5.13.3 of 3GPP TS23.682 may be used to perform block 1140.

Figure 12:
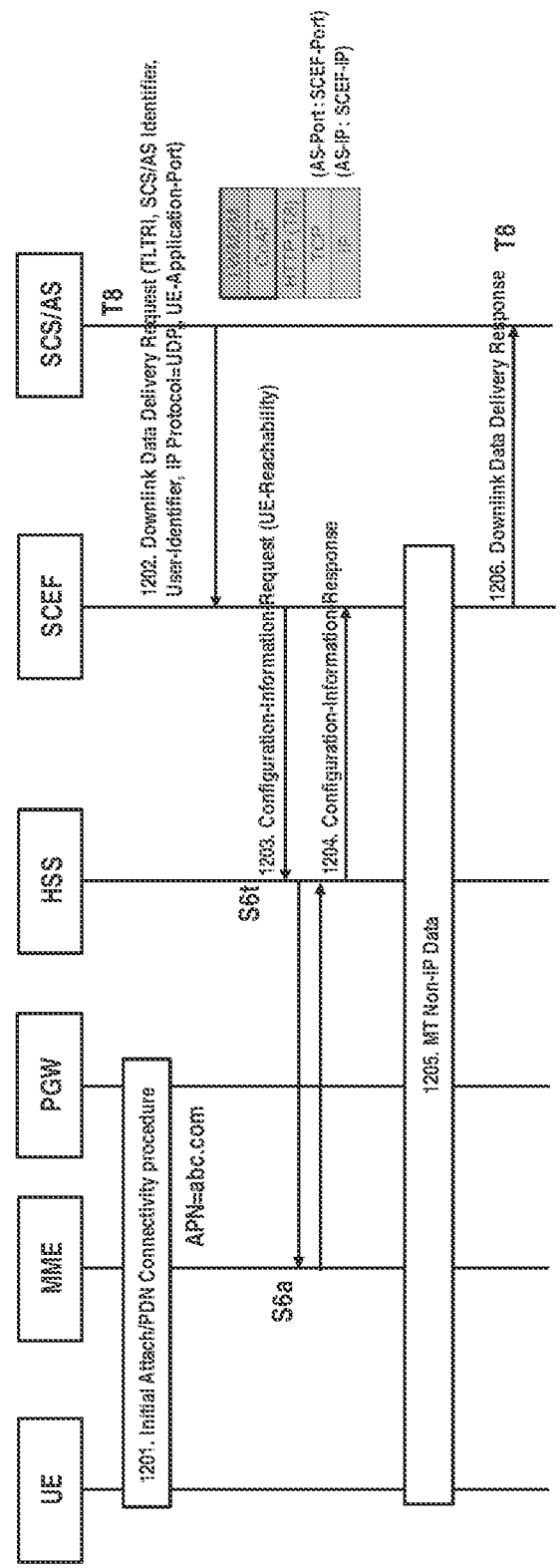
FIG. 12 is a flowchart illustrating an exemplary process according to another embodiment of the disclosure.

FIG. 12 is a flowchart illustrating an exemplary process according to another embodiment of the disclosure. In this process, the server is an SCS/AS, the network exposure node is an SCEF, the subscriber management node is an HSS, and the packet gateway node is a PGW. This process may be used for MT non-IP data delivery such that the SCS/AS sends MT non-IP data to the UE via the SCEF. It is assumed that at block 1201, the UE performs E-UTRAN Initial Attach procedure or UE requested PDN Connectivity procedure or PDP Context Activation Procedure such that the PGW assigns an IP address for the UE based on the value of an APN-NIDD at block 1202, the SCS/AS sends a Downlink Data Delivery Request message to the SCEF. The Downlink Data Delivery Request message includes a User-Identifier, a TLTRI, an SCS/AS Identifier, an IP Protocol and a UE-Application-Port. Alternatively, if the SCS/AS can only send an MT message to a single port and a single protocol in the UE, a default IP Protocol and a default UE-Application-Port may be pre-configured in the SCEF. In such scenario, the SCS/AS does not need to provide the IP Protocol and the UE-Application-Port in the request.

At block 1203, the SCEF sends a Configuration Information Request message to the HSS to monitor the UE's reachability status. Since the UE is already connected to the network, the HSS provides the UE reachability report in a Configuration Information Response message at block 1204. This may follow the procedure defined in clause 5.6.1 of 3GPP TS23.682. Thus, the details of the interaction between the HSS and the MME are omitted here. The UE reachability report contains the IMSI of the UE, the APN of the established PDN, the PDN type (IP or non-IP) and the IP address assigned to the UE if the PDN type is IP. Optionally, the SCEF may determine whether the Data Delivery Configuration including the same ISMI and the APN can be found. If it can be found, the SCEF may validate this non-IP data delivery. At block 1205, the SCEF performs steps 2, 3, 8 and 9 defined in clause 5.13.3 of 3GPP TS23.682, such that the downlink non-IP data is delivered to the UE. At block 1206, the SCEF sends a Downlink Data Delivery Response message to the SCS/AS to acknowledge the result of the Downlink Data Delivery. The Downlink Data Delivery Response message includes TLTRI and Cause.

Figure 13:
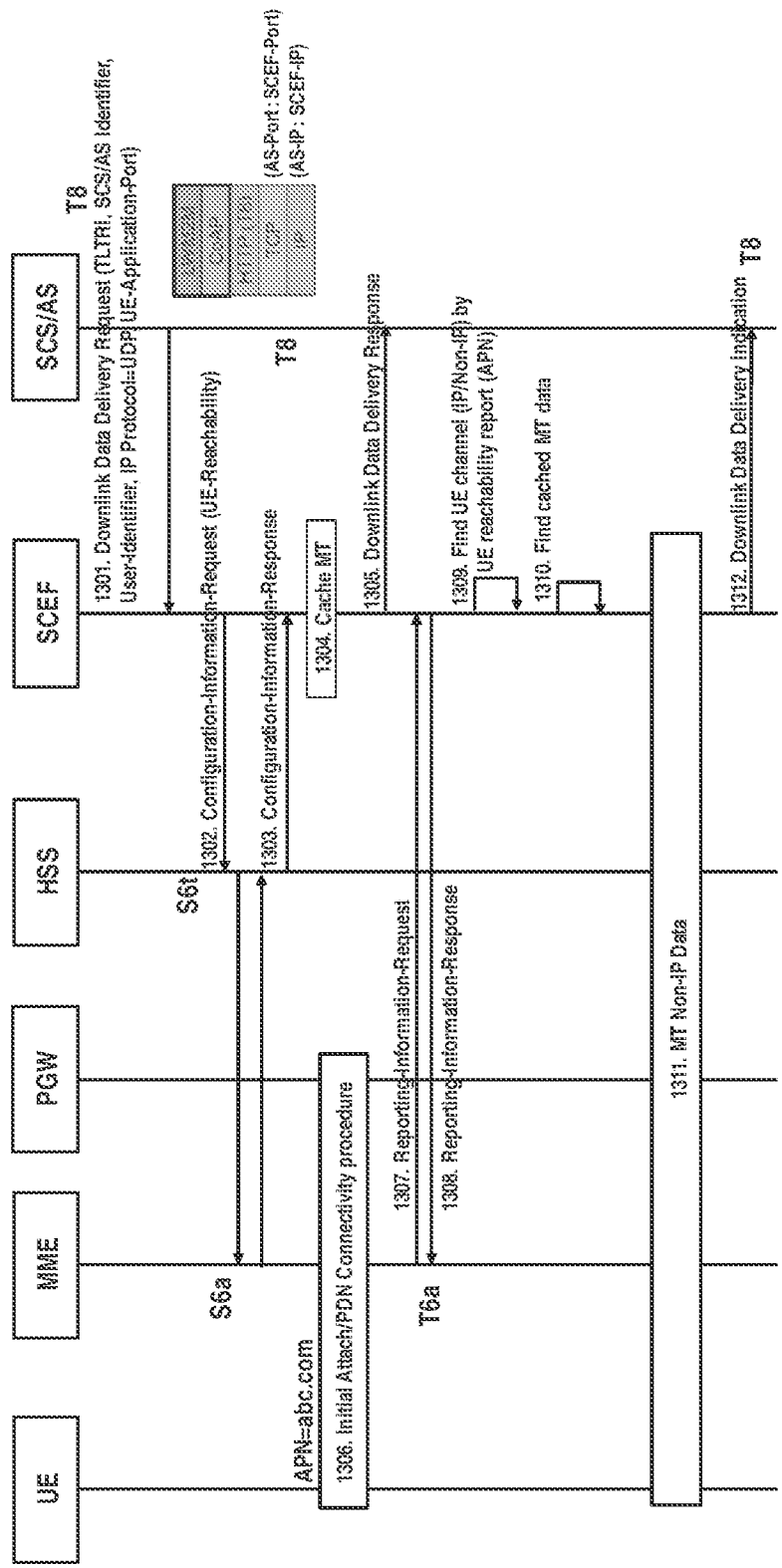
FIG. 13 is a flowchart illustrating an exemplary process according to another embodiment of the disclosure.

FIG. 13 is a flowchart illustrating an exemplary process according to another embodiment of the disclosure. This process is similar to that shown in FIG. 12 except that when the SCEF tries to deliver the non-IP data for the first time, the UE is connected to the network in FIG. 12 but is not connected to the network in FIG. 13. At block 1301, the SCS/AS sends a Downlink Data Delivery Request message to the SCEF. The Downlink Data Delivery Request message includes a User-Identifier, a TLTRI, an SCS/AS Identifier, an IP Protocol and a UE-Application-Port. At block 1302, the SCEF sends a Configuration Information Request message to the HSS to monitor the UE's reachability status. The Configuration Information Request message includes the User-Identifier and a Monitoring Type which is UE Reachability. Since the UE is not connected to the network, the HSS sends to the SCEF a Configuration Information Response message including Cause at block 1303. The Cause value indicates acceptance of the Configuration Information Request. This may follow the procedure defined in clause 5.6.1 of 3GPP TS23.682. Thus, the details of the interaction between the HSS and the MME are omitted here. At block 1304, the SCEF caches the mobile terminated data, waiting for the UE to wake up and connect to the network. At block 1305, the SCEF sends a Downlink Data Delivery Response message to the SCS/AS informing that the UE is not reachable.

It is assumed that the UE performs E-UTRAN Initial Attach procedure or UE requested PDN Connectivity procedure or PDP Context Activation Procedure such that the PGW assigns an IP address for the UE based on the value of an APN-NIDD at block 1306. Since the UE wakes up and connects to the network, the MME sends a UE reachability report to the SCEF in a Reporting-Information-Request message at block 1307. At block 1309, based on the UE reachability report, the SCEF decides to use non-IP PDN channel to deliver the MT data to the UE. At block 1310, the SCEF finds the buffered MT data and prepares to deliver the data. At block 1311, the SCEF performs steps 2, 3, 8 and 9 defined in clause 5.13.3 of 3GPP TS23.682, such that the downlink non-IP data is delivered to the UE. At block 1312, the SCEF sends a Downlink Data Delivery Indication message to the SCS/AS to acknowledge the result of the Downlink Data Delivery. The Downlink Data Delivery Indication message includes TLTRI and Cause.

Figure 14:
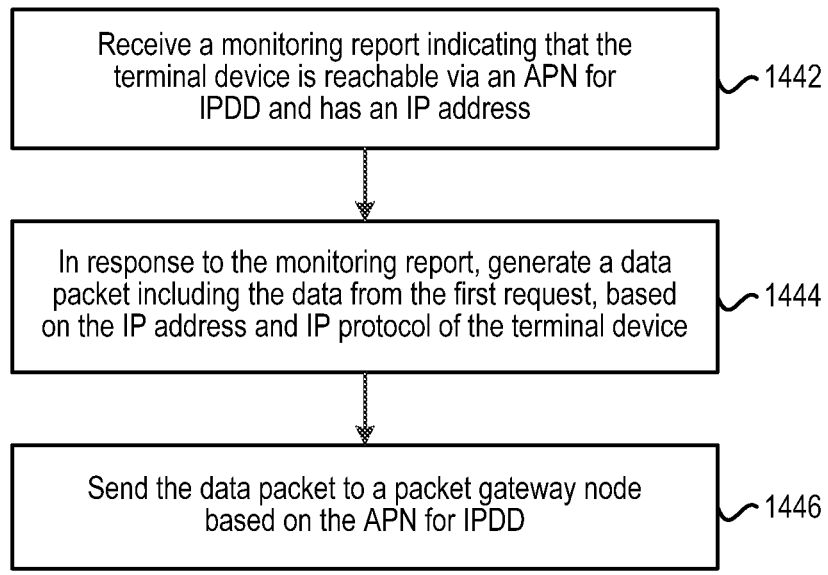
FIG. 14 is a flowchart for explaining the method of FIG. 9.

FIG. 14 is a flowchart for explaining the method of FIG. 9. The flowchart of FIG. 14 corresponds to MT IP data delivery. At block 1442, the network exposure node receives a monitoring report indicating that the terminal device is reachable via an APN for IPDD and has an IP address. As an exemplary example, the monitoring report may be received in a Configuration Information Response message. At block 1444, in response to the monitoring report, the network exposure node generates a data packet including the data from the first request, based on the IP address and the IP protocol of the terminal device. The IP address of the terminal device may be included in the monitoring report. The IP protocol of the terminal device may be indicated in the first request or pre-configured in the network exposure node. Optionally, in case the application port of the terminal device is indicated in the first request, the generated data packet is generated based further on the application port of the terminal device. At block 1446, the network exposure node sends the data packet to a packet gateway node based on the APN for IPDD. As described above, the packet gateway node may take the form of a PGW, a UPF, or any other entity having similar functionality.

Figure 15:
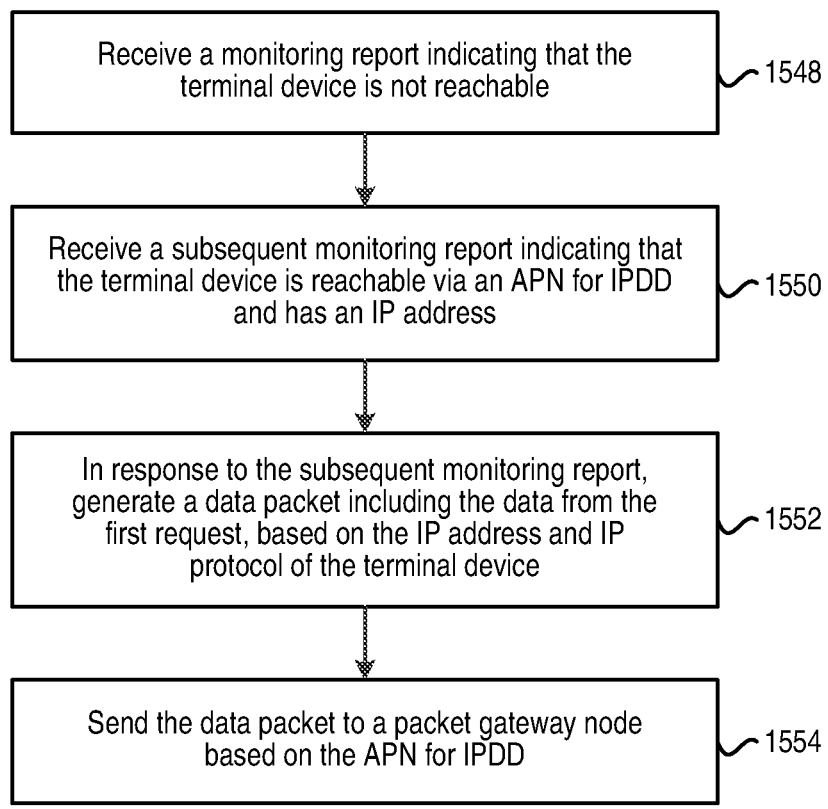
FIG. 15 is a flowchart for explaining the method of FIG. 9.

FIG. 15 is a flowchart for explaining the method of FIG. 9. The flowchart of FIG. 15 also corresponds to MT IP data delivery. At block 1548, the network exposure node receives a monitoring report indicating that the terminal device is not reachable. As an exemplary example, the monitoring report may be received in a Configuration Information Response message. At block 1550, the network exposure node receives a subsequent monitoring report indicating that the terminal device is reachable via an APN for IPDD and has an IP address. As an exemplary example, the monitoring report may be received in a Reporting Information Request message. At block 1552, in response to the subsequent monitoring report, the network exposure node generates a data packet including the data from the first request, based on the IP address and the IP protocol of the terminal device. The generation of the data packet may be similar to block 1444. At block 1554, the network exposure node sends the data packet to a packet gateway node based on the APN for IPDD.

Figure 16:
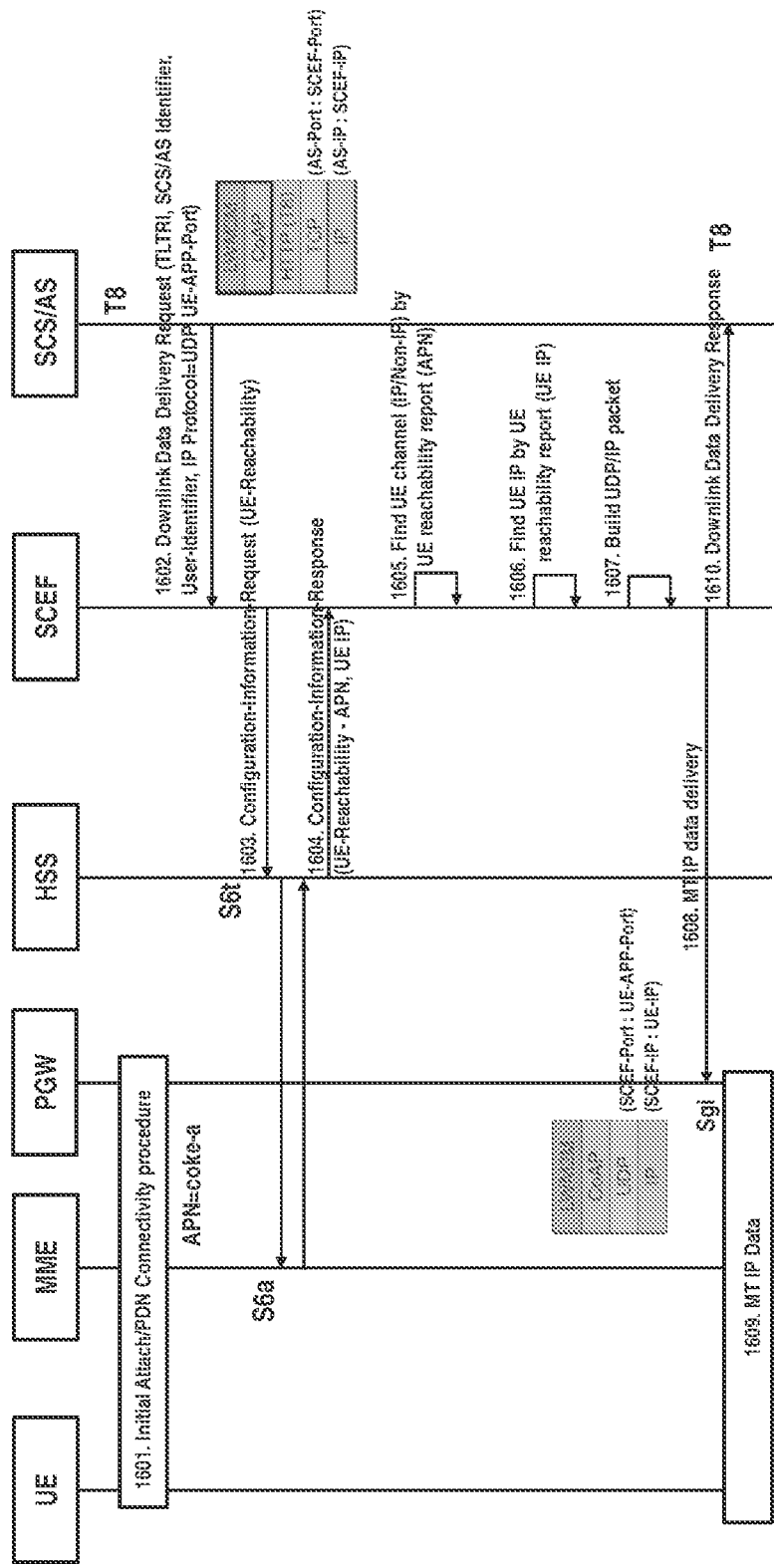
FIG. 16 is a flowchart illustrating an exemplary process according to another embodiment of the disclosure.

FIG. 16 is a flowchart illustrating an exemplary process according to another embodiment of the disclosure. In this process, the server is an SCS/AS, the network exposure node is an SCEF, the subscriber management node is an HSS, and the packet gateway node is a PGW. This process may be used for MT IP data delivery such that the SCS/AS sends MT IP data to the UE via the SCEF. It is assumed that at block 1601, the UE performs E-UTRAN Initial Attach procedure or UE requested PDN Connectivity procedure or PDP Context Activation Procedure such that the PGW assigns an IP address for the UE based on the value of an APN-IPDD. At block 1602, the SCS/AS sends a Downlink Data Delivery Request message to the SCEF. The Downlink Data Delivery Request message includes a User-Identifier, a TLTRI, an SCS/AS Identifier, an IP Protocol and a UE-Application-Port. At block 1603, the SCEF sends a Configuration Information Request message to the HSS to monitor the UE's reachability status. Since the UE is already connected to the network, the HSS provides the UE reachability report in a Configuration Information Response message at block 1604. This may follow the procedure defined in clause 5.6.1 of 3GPP TS23.682. Thus, the details of the interaction between the HSS and the MME are omitted here. The UE reachability report contains the IMSI of the UE, the APN of the established PDN, the PDN type (IP or non-IP) and the IP address assigned to the UE if the PDN type is IP. Optionally, the SCEF may determine whether the Data Delivery Configuration including the same ISMI and the APN can be found. If it can be found, the SCEF may validate this IP data delivery.

At block 1605, based on the UE reachability report, the SCEF decides to use an IP PDN channel to deliver the MT data to the UE. At block 1606, the SCEF gets the UE IP address from the UE reachability report and finds the UE application port from the Downlink Data Delivery Request message received at block 1602. At block 1607, the SCEF prepares an UDP/IP packet to deliver the MT data. At block 1608, the SCEF sends the MT Data to the PGW. At block 1609, the PGW delivers the data to the UE. At block 1610, the SCEF sends a Downlink Data Delivery Response message to the SCS/AS to acknowledge the result of the Downlink Data Delivery. The Downlink Data Delivery Response message includes TLTRI and Cause.

Figure 17:
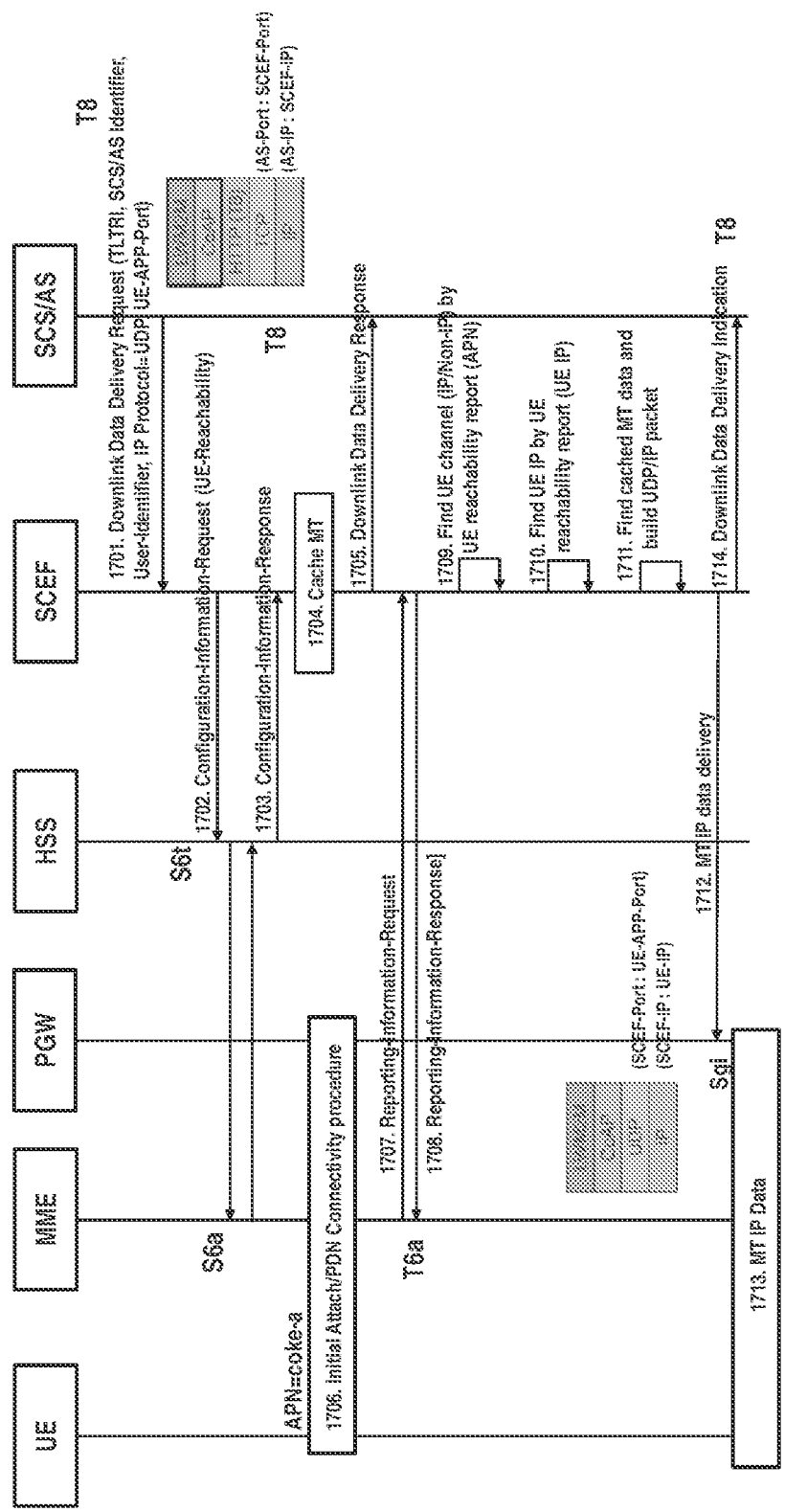
FIG. 17 is a flowchart illustrating an exemplary process according to another embodiment of the disclosure.

FIG. 17 is a flowchart illustrating an exemplary process according to another embodiment of the disclosure. This process is similar to that shown in FIG. 16 except that when the SCEF tries to deliver the IP data for the first time, the UE is connected to the network in FIG. 16 but is not connected to the network in FIG. 17. At block 1701, the SCS/AS sends a Downlink Data Delivery Request message to the SCEF. The Downlink Data Delivery Request message includes a User-Identifier, a TLTRI, an SCS/AS Identifier, an IP Protocol and a UE-Application-Port. At block 1702, the SCEF sends a Configuration Information Request message to the HSS to monitor the UE's reachability status. The Configuration Information Request message includes the User-Identifier and a Monitoring Type which is UE Reachability. Since the UE is not connected to the network, the HSS sends to the SCEF a Configuration Information Response message including Cause at block 1703. The Cause value indicates acceptance of the Configuration Information Request. This may follow the procedure defined in clause 5.6.1 of 3GPP TS23.682. Thus, the details of the interaction between the HSS and the MME are omitted here. At block 1704, the SCEF caches the MT data, waiting for the UE to wake up and connect to the network. At block 1705, the SCEF sends a Downlink Data Delivery Response message to the SCS/AS informing that UE is not reachable.

It is assumed that the UE performs E-UTRAN Initial Attach procedure or UE requested PDN Connectivity procedure or PDP Context Activation Procedure such that the PGW assigns an IP address for the UE based on the value of an APN-IPDD at block 1706. Since the UE wakes up and connects to the network, the MME sends a UE reachability report to the SCEF in a Reporting-Information-Request message at block 1707. At block 1708, the SCEF sends a Reporting-Information-Response message to the MME. At block 1709, based on the UE reachability report, the SCEF decides to use an IP PDN channel to deliver the MT data to the UE. At block 1710, the SCEF gets the UE IP address from the UE reachability report and finds the UE application port from the Downlink Data Delivery Request message received at block 1701. At block 1711, the SCEF finds the cached MT data and prepares an UDP/IP packet to deliver the MT data. At block 1712, the SCEF sends the MT Data to the PGW. At block 1713, the PGW delivers the data to UE. At block 1714, the SCEF sends a Downlink Data Delivery Indication message to the SCS/AS to acknowledge the result of the Downlink Data Delivery. The Downlink Data Delivery Indication message includes TLTRI and Cause. Note that when the UE is attached to both IP APN and non-IP APN, it may be up to the operator policies to select the process shown in FIG. 12/13 or the process shown in FIG. 16/17 for MT data delivery.

Figure 18:
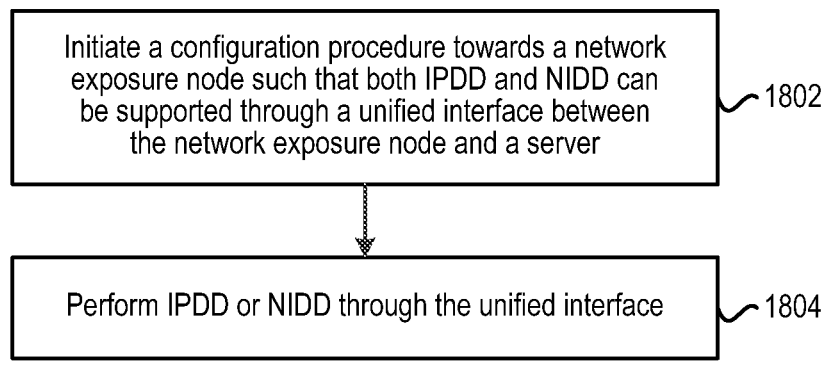
FIG. 18 is a flowchart illustrating a method implemented at a server according to an embodiment of the disclosure.

FIG. 18 is a flowchart illustrating a method implemented at a server according to an embodiment of the disclosure. As mentioned above, the server may be an SCS or an AS. At block 1802, the server initiates a configuration procedure towards a network exposure node such that both IPDD and NIDD can be supported through a unified interface between the network exposure node and the server. The configuration procedure may be initiated by sending, to the network exposure node, a first request for configuring data delivery for a terminal device. The details of the first request may be similar to those provided for block 406. At block 1804, the server performs IPDD or NIDD through the unified interface. Since a unified interface is exposed by the network exposure node for the server, the data delivery procedure for the server can be simplified. For MT data delivery, the server may send, to the network exposure node through the unified interface, a second request for data delivery to a terminal device that includes data to be delivered to the terminal device. The details of the second request may be similar to those of the first request described for block 924.

Figure 19:
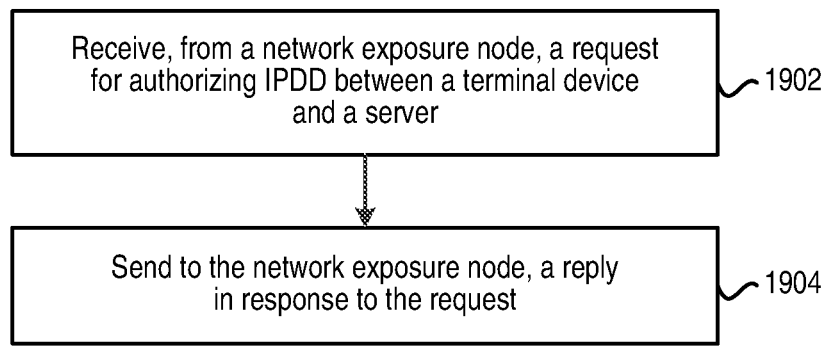
FIG. 19 is a flowchart illustrating a method implemented at a subscriber management node according to an embodiment of the disclosure.

FIG. 19 is a flowchart illustrating a method implemented at a subscriber management node according to an embodiment of the disclosure. As mentioned above, the subscriber management node may take the form of an HSS, a UDM, or any other entity having similar functionality. At block 1902, the subscriber management node receives, from a network exposure node, a request for authorizing IPDD between a terminal device and a server. Block 1902 corresponds to block 410 and its details are omitted here. At block 1904, the subscriber management node sends, to the network exposure node, a reply in response to the request. Block 1904 corresponds to block 412 and its details are omitted here.

Figure 20:
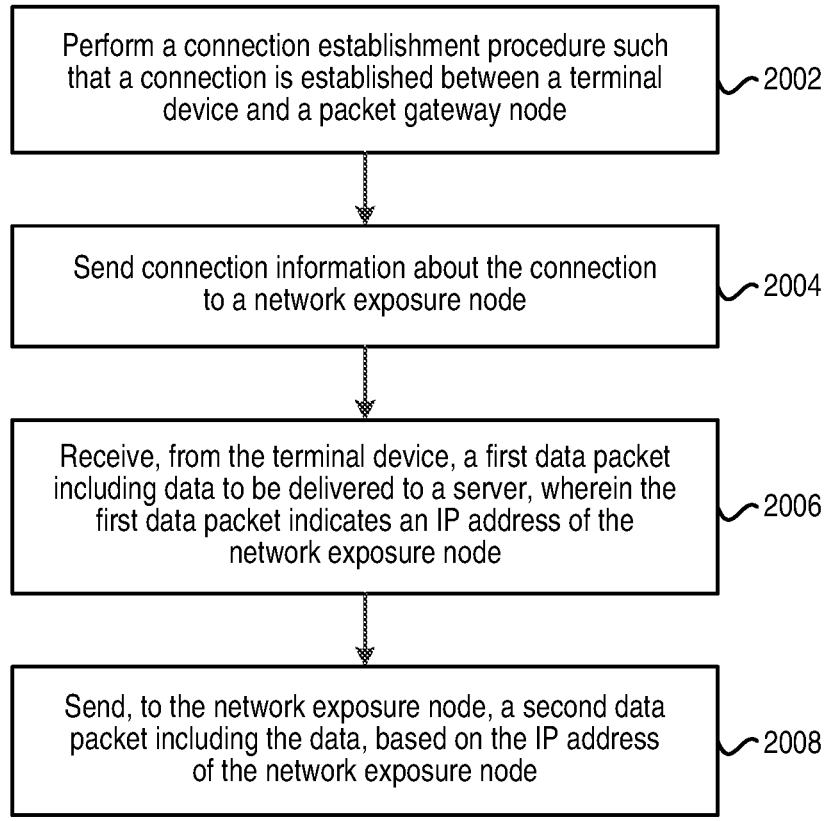
FIG. 20 is a flowchart illustrating a method implemented at a packet gateway node according to an embodiment of the disclosure.

FIG. 20 is a flowchart illustrating a method implemented at a packet gateway node according to an embodiment of the disclosure. As mentioned above, the packet gateway node may take the form of a PGW, a UPF, or any other entity having similar functionality. At block 2002, the packet gateway node performs a connection establishment procedure such that a connection is established between a terminal device and the packet gateway node. For example, the connection establishment procedure may be E-UTRAN Initial Attach procedure or UE requested PDN Connectivity procedure or PDP Context Activation Procedure. At block 2004, the packet gateway node sends connection information about the connection to a network exposure node. Block 2004 corresponds to block 614 and its details are omitted here. At block 2006, the packet gateway node receives, from the terminal device, a first data packet including data to be delivered to a server. The first data packet indicates an IP address of the network exposure node. Optionally, the first data packet may further indicate a port of the server. At block 2008, the packet gateway node sends, to the network exposure node, a second data packet including the data, based on the IP address of the network exposure node. Optionally, the second data packet may further indicate the port of the server.

Figure 21:
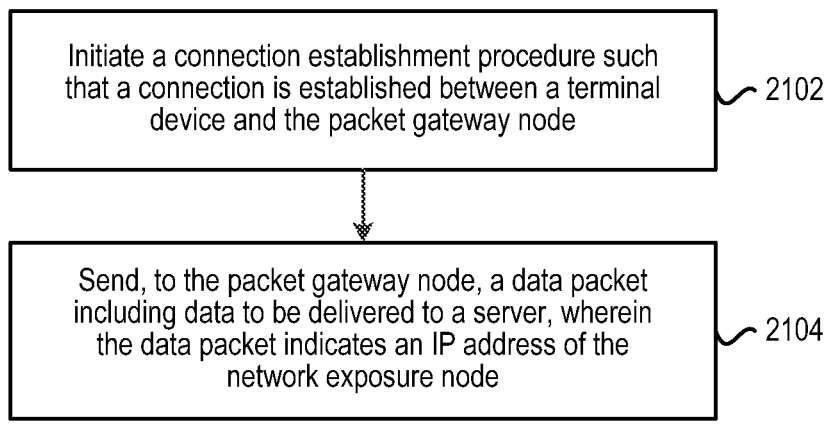
FIG. 21 is a flowchart illustrating a method implemented at a terminal device according to an embodiment of the disclosure.

FIG. 21 is a flowchart illustrating a method implemented at a terminal device according to an embodiment of the disclosure. At block 2102, the terminal device initiates a connection establishment procedure such that a connection is established between the terminal device and a packet gateway node. Block 2102 corresponds to block 2002 and its details are omitted here. At block 2104, the terminal device sends, to the packet gateway node, a data packet including data to be delivered to a server. The data packet indicates an IP address of the network exposure node. Optionally, the data packet may further indicate a port of the server. It should be noted that two blocks shown in succession in the above figures may, in fact, be executed substantially concurrently, or the blocks may sometimes be executed in the reverse order, depending upon the functionality involved.

Figure 22:
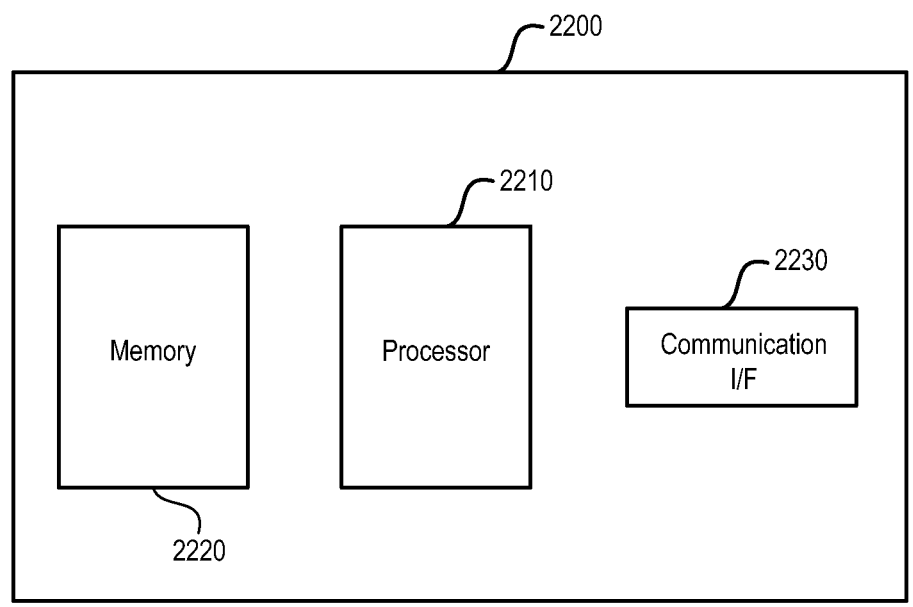
FIG. 22 is a block diagram showing an apparatus suitable for use in practicing some embodiments of the disclosure.

FIG. 22 is a block diagram showing an apparatus suitable for use in practicing some embodiments of the disclosure. For example, any one of the network exposure node, the server, the subscriber management node, the packet gateway node and the terminal device described above may be implemented through the apparatus 2200. As shown, the apparatus 2200 may include a processor 2210, a memory 2220 that stores a program, and a communication interface 2230 for communicating data with other external devices through wired and/or wireless communication.

The program includes program instructions that, when executed by the processor 2210, enable the apparatus 2200 to operate in accordance with the embodiments of the present disclosure, as discussed above. That is, the embodiments of the present disclosure may be implemented at least in part by computer software executable by the processor 2210, or by hardware, or by a combination of software and hardware.

The memory 2220 may be of any type suitable to the local technical environment and may be implemented using any suitable data storage technology, such as semiconductor based memory devices, flash memories, magnetic memory devices and systems, optical memory devices and systems, fixed memories and removable memories. The processor 2210 may be of any type suitable to the local technical environment, and may include one or more of general purpose computers, special purpose computers, microprocessors, digital signal processors (DSPs) and processors based on multi-core processor architectures, as non-limiting examples.

Figures 23, 24:
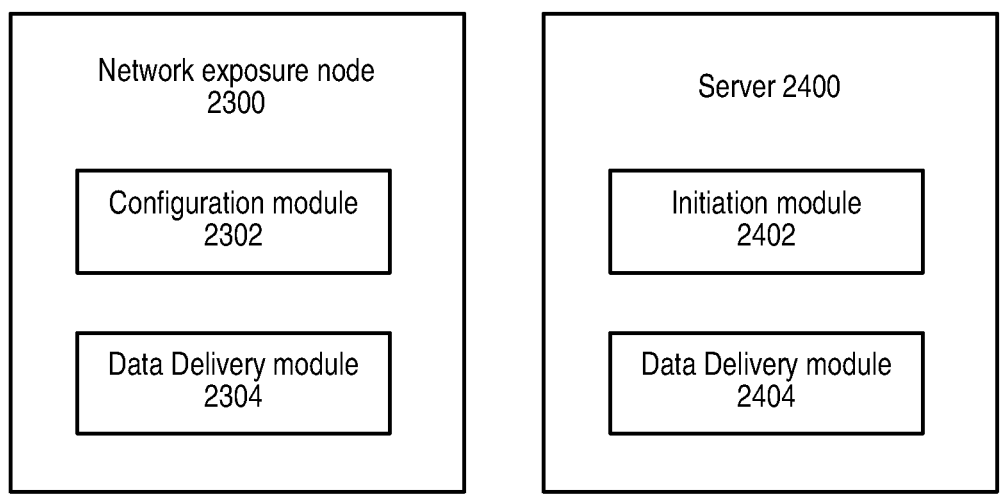
FIG. 23 is a block diagram showing a network exposure node according to an embodiment of the disclosure.
FIG. 24 is a block diagram showing a server according to an embodiment of the disclosure.

FIG. 23 is a block diagram showing a network exposure node according to an embodiment of the disclosure. As shown, the network exposure node 2300 comprises a configuration module 2302 and a data delivery module 2304. The configuration module 2302 may be configured to perform a configuration procedure such that both IPDD and NIDD can be supported through a unified interface between the network exposure node and a server, as described above with respect to block 302. The data delivery module 2304 may be configured to perform IPDD or NIDD through the unified interface, as described above with respect to block 304.

FIG. 24 is a block diagram showing a server according to an embodiment of the disclosure. As shown, the server 2400 comprises an initiation module 2402 and a data delivery module 2404. The initiation module 2402 may be configured to initiate a configuration procedure towards a network exposure node such that both IPDD and NIDD can be supported through a unified interface between the network exposure node and the server, as described above with respect to block 1802. The data delivery module 2404 may be configured to perform IPDD or NIDD through the unified interface, as described above with respect to block 1804.

Figure 25:
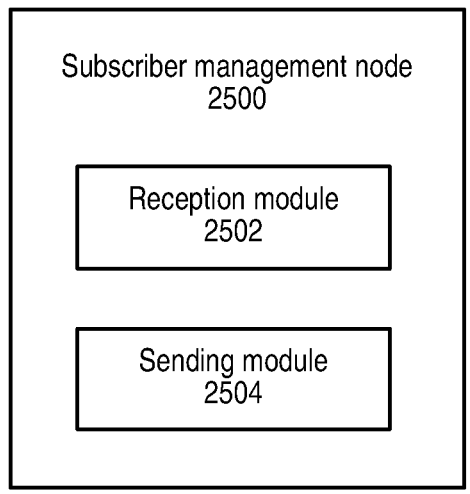
FIG. 25 is a block diagram showing a subscriber management node according to an embodiment of the disclosure.

FIG. 25 is a block diagram showing a subscriber management node according to an embodiment of the disclosure. As shown, the subscriber management node 2500 comprises a reception module 2502 and a sending module 2504. The reception module 2502 may be configured to receive, from a network exposure node, a request for authorizing IPDD between a terminal device and a server, as described above with respect to block 1902. The sending module 2504 may be configured to send, to the network exposure node, a reply in response to the request, as described above with respect to block 1904.

Figure 26:
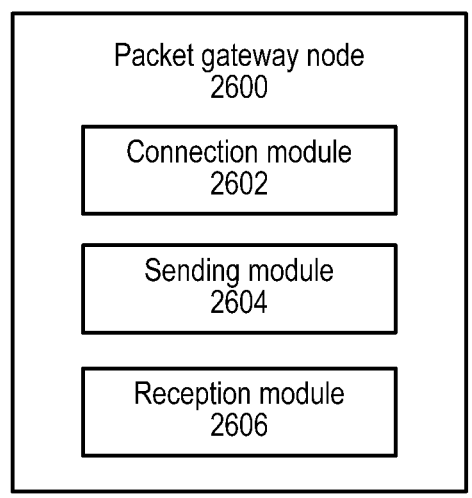
FIG. 26 is a block diagram showing a packet gateway node according to an embodiment of the disclosure.

FIG. 26 is a block diagram showing a packet gateway node according to an embodiment of the disclosure. As shown, the packet gateway node 2600 comprises a connection module 2602, a sending module 2604 and a reception module 2606. The connection module 2602 may be configured to perform a connection establishment procedure such that a connection is established between a terminal device and the packet gateway node, as described above with respect to block 2002. The sending module 2604 may be configured to send connection information about the connection to a network exposure node, as described above with respect to block 2004. The reception module 2606 may be configured to receive, from the terminal device, a first data packet including data to be delivered to a server, as described above with respect to block 2006. The first data packet indicates an IP address of the network exposure node. The sending module 2604 may be further configured to send, to the network exposure node, a second data packet including the data, based on the IP address of the network exposure node, as described above with respect to block 2008.

Figure 27:
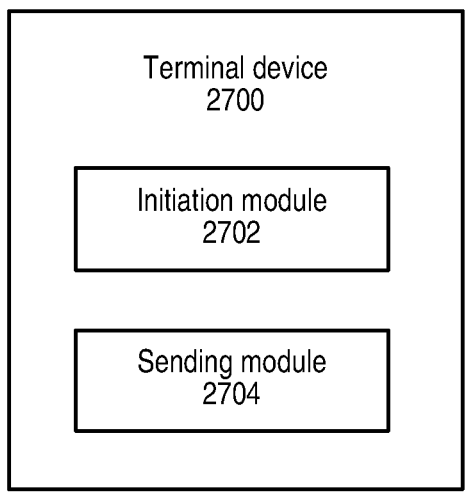
FIG. 27 is a block diagram showing a terminal device according to an embodiment of the disclosure.

FIG. 27 is a block diagram showing a terminal device according to an embodiment of the disclosure. As shown, the terminal device 2700 comprises an initiation module 2702 and a sending module 2704. The initiation module 2702 may be configured to initiate a connection establishment procedure such that a connection is established between the terminal device and a packet gateway node, as described above with respect to block 2102. The sending module 2704 may be configured to send, to the packet gateway node, a data packet including data to be delivered to a server, as described above with respect to block 2104. The data packet indicates an IP address of the network exposure node. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a network exposure node, the method comprising:
performing a configuration procedure such that both internet protocol data delivery (IPDD) and non-IP data delivery (NIDD) can be supported through a unified interface between the network exposure node and a server; and
performing IPDD or NIDD through the unified interface;
wherein the performing of IPDD or NIDD through the unified interface comprises:
receiving, from the server through the unified interface, a first request for data delivery to a terminal device, the first request including data to be delivered to the terminal device;

sending, to a subscriber management node, a second request for monitoring reachability status of the terminal device;

receiving, from the subscriber management node, at least one monitoring report about reachability status of the terminal device; and sending the data to the terminal device based on the received at least one monitoring report.

2. The method according to claim 1, wherein performing the configuration procedure comprises:

receiving, from the server, a first request for configuring data delivery for a terminal device;

generating a second request for authorizing IPDD or NIDD between the terminal device and the server, based on the first request;

sending the second request to a subscriber management node; and receiving, from the subscriber management node, a reply in response to the second request.

3. The method according to claim 2, wherein the first request includes an identifier (ID) of the terminal device and an ID of the server;

wherein the generating of the second request comprises:
determining an access point name (APN) for IPDD or NIDD between the terminal device and the server, based on the ID of the terminal device and the ID of the server; and wherein the second request includes the determined APN for IPDD or NIDD and the ID of the terminal device.

4. The method according to claim 2, wherein the first request indicates a port of the server; or wherein the port of the server is pre-configured in the network exposure node.

5. The method according to claim 2, wherein the server is a service capability server (SCS) or an application server (AS), and the port of the server is an SCS/AS port; and wherein the second request is an IPDD or NIDD Information Request message, and the reply in response to the second request is an IPDD or NIDD Information Answer message.

6. The method according to claim 1, wherein the performing of IPDD through the unified interface comprises:

obtaining, from a packet gateway node, connection information about a connection between a terminal device and the packet gateway node;

in response to receiving a data packet from the terminal device via the packet gateway node, determining an IP address of the server based on the data packet, the obtained connection information and a result of the configuration procedure; and sending data from the data packet to the server through the unified interface based on the determined IP address of the server.

7. The method according to claim 6, wherein the connection information includes: an IP address of the terminal device, an international mobile subscriber identity (IMSI) of the terminal device, and an APN for IPDD;

wherein the result of the configuration procedure includes the IMSI of the terminal device, the APN for IPDD, and an IP address of the server; and wherein determining the IP address of the server comprises:

determining a combination of the IMSI of the terminal device and the APN for IPDD from the connection information, based on an IP address of the terminal device included in the data packet; and determining the IP address of the server from the result of the configuration procedure, based on the determined combination.

8. The method according to claim 6, wherein the connection information is received via Radius or Diameter protocol; and wherein the data from the data packet is sent in an Uplink Data Notification Request message.

9. The method according to claim 1, wherein the first request indicates an IP protocol of the terminal device; or wherein the IP protocol of the terminal device is pre-configured in the network exposure node.

10. The method according to claim 9, wherein the first request further indicates an application port of the terminal device; or wherein the application port of the terminal device is pre-configured in the network exposure node.

11. The method according to claim 1, wherein the receiving the at least one monitoring report comprises:

receiving a monitoring report indicating that the terminal device is reachable via an APN for NIDD; and wherein the sending the data to the terminal device comprises in response to the monitoring report, sending the data to the terminal device through NIDD.

12. The method according to claim 1, wherein receiving the at least one monitoring report comprises:

receiving a monitoring report indicating that the terminal device is not reachable; and receiving a subsequent monitoring report indicating that the terminal device is reachable via an APN for NIDD; and wherein sending the data to the terminal device comprises in response to the subsequent monitoring report, sending the data to the terminal device through NIDD.

13. The method according to claim 1, wherein receiving the at least one monitoring report comprises:

receiving a monitoring report indicating that the terminal device is reachable via an APN for IPDD and has an IP address; and wherein sending the data to the terminal device comprises:

in response to the monitoring report, generating a data packet including the data from the first request, based on the IP address and the IP protocol of the terminal device; and sending the data packet to a packet gateway node based on the APN for IPDD.

14. The method according to claim 1, wherein receiving the at least one monitoring report comprises:

receiving a monitoring report indicating that the terminal device is not reachable; and receiving a subsequent monitoring report indicating that the terminal device is reachable via an APN for IPDD and has an IP address; and wherein the sending the data to the terminal device comprises:

in response to the subsequent monitoring report, generating a data packet including the data from the first request, based on the IP address and the IP protocol of the terminal device; and sending the data packet to a packet gateway node based on the APN for IPDD.

15. The method according to claim 1, wherein the first request is a Downlink Data Delivery Request message, the second request is a Configuration Information Request message, and the at least one monitoring report is received in a Configuration Information Response message or a Reporting Information Request message.

16. A method implemented at a server, the method comprising:
- initiating a configuration procedure towards a network exposure node such that both internet protocol data delivery (IPDD) and non-IP data delivery (NIDD) can be supported through a unified interface between the network exposure node and the server; and
- performing IPDD or NIDD through the unified interface;
- wherein the initiating the configuration procedure comprises:
  - sending, to the network exposure node, a first request for configuring data delivery for a terminal device, wherein the first request indicates a port of the server;
- wherein the performing IPDD or NIDD through the unified interface comprises:
  - sending, to the network exposure node through the unified interface, a second request for data delivery to a terminal device, wherein the second request includes data to be delivered to the terminal device and indicates an IP protocol of the terminal device; and
- wherein the second request further indicates an application port of the terminal device.

\* \* \* \* \*